US012515700B2

(12) United States Patent
Paxton et al.

(10) Patent No.: US 12,515,700 B2
(45) Date of Patent: Jan. 6, 2026

(54) REMOTE RELOCATION SYSTEM FOR AUTONOMOUS VEHICLES

(71) Applicant: GM Cruise Holdings LLC, San Francisco, CA (US)

(72) Inventors: Tucker Allen Paxton, San Mateo, CA (US); Davide Bacchet, San Jose, CA (US); Xiaoyu Zhou, San Francisco, CA (US); Juan Fasola, San Francisco, CA (US); Jason Evans, Marietta, GA (US); Katherine Mary Stumpf, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 195 days.

(21) Appl. No.: 18/336,584

(22) Filed: Jun. 16, 2023

(65) Prior Publication Data

US 2024/0416960 A1 Dec. 19, 2024

(51) Int. Cl.
*B60W 60/00* (2020.01)
*B60W 30/095* (2012.01)
*G05D 1/00* (2024.01)

(52) U.S. Cl.
CPC .... *B60W 60/0011* (2020.02); *B60W 30/0956* (2013.01); *G05D 1/0022* (2013.01); *B60W 2556/45* (2020.02)

(58) Field of Classification Search
CPC ......... B60W 60/0011; B60W 30/0956; B60W 2556/45; G05D 1/0022
See application file for complete search history.

(56) References Cited

U.S. PATENT DOCUMENTS

2023/0050192 A1\* 2/2023 Quirynen ............. G08G 1/0112
2023/0227065 A1\* 7/2023 Vora .................... B60W 60/0011
701/23

\* cited by examiner

*Primary Examiner* — Dylan M Katz
(74) *Attorney, Agent, or Firm* — CANTOR COLBURN LLP

(57) ABSTRACT

It may be desirable for a remote advisor to request an autonomous vehicle to relocate to a target relocation pose using a freespace planner that has fewer constraints than the structured planner that is used for normal driving. The autonomous vehicle planning stack can include a remote vehicle interface, which can serve as the application programming interface for remote requestors to request relocation of the autonomous vehicle. The remote vehicle interface may implement a relocation state machine to carry out different parts of a relocation session. A scenario manager may subscribe to the state of the relocation state machine. Based on the state, the scenario manager can request the freespace planner to generate an output plan for the target relocation pose and can orchestrate handoff between different motion planners to relocate the autonomous vehicle.

18 Claims, 10 Drawing Sheets

REMOTE RELOCATION SYSTEM FOR AUTONOMOUS VEHICLES

BACKGROUND

Technical Field

The present disclosure relates to autonomous vehicles and, more specifically, to remote relocation systems for autonomous vehicles (AVs).

Introduction

AVs also known as self-driving cars, and driverless vehicles, may be vehicles that use multiple sensors to sense the environment and move without human input. Automation technology in AVs may enable vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

DETAILED DESCRIPTION

Figure 1:
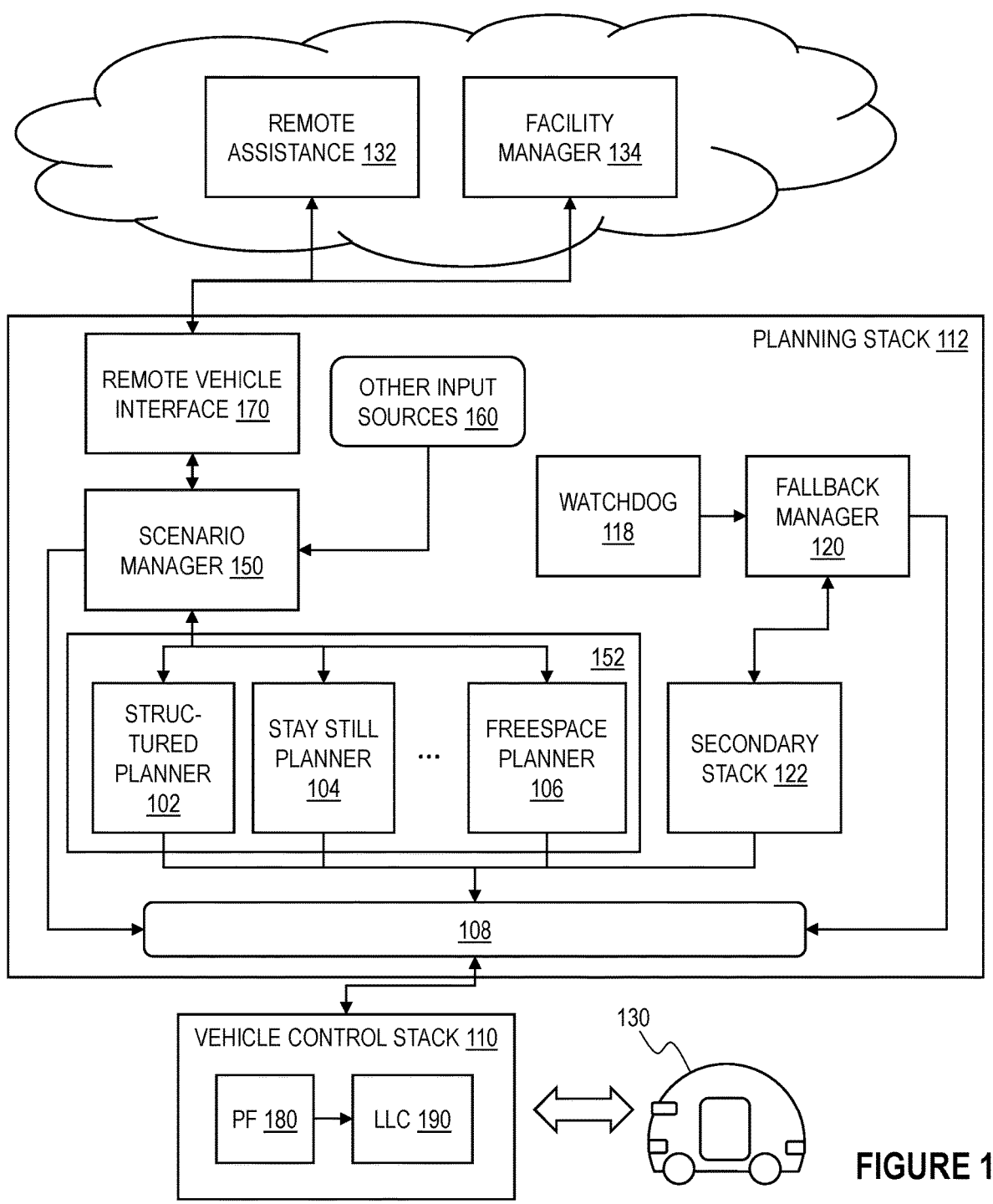
FIG. 1 illustrates exemplary remote requestors, a planning stack, and a vehicle control stack, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Introduction to AV Stack

AVs can provide many benefits. For instance, AVs may have the potential to transform urban living by offering an opportunity for efficient, accessible, and affordable transportation. An AV may be equipped with various sensors to sense the environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. The AV may create plans based on map information, localization, data from perception, and data from prediction. Subsequently, plans can be sent to (vehicle) control stack to control the AV (e.g., for steering, accelerating, decelerating, braking, etc.) according to the plan.

In some cases, the AV stack (sometimes referred to as the software stack of a vehicle) may include a layered arrangement of stacks, including stacks such as a perception stack, a prediction stack, a planning stack, and a vehicle control stack. The perception stack may generate tracked objects and inferences about the tracked objects. The prediction stack may generate predictions of movement or kinematics of the track objects. The planning stack may generate one or more plans and transmit the one or more plans to the vehicle control stack. The vehicle control stack can process a plan and generate commands to vehicle hardware controls to cause the vehicle to execute the plan (e.g., cause the vehicle to use appropriate vehicle signal lights, steer, drive, and follow the trajectory).

A plan can include several parts or components, such as one or more trajectories, a target gear request (e.g., drive, reverse, neutral, low gear, etc.), a blinker light request, a hazard light request, a braking request, and a honking request. A plan can include requests or instructions (e.g., software instructions) for vehicle controls in addition to one or more (reference) trajectories. A trajectory can include a contiguous line that connects the starting point/pose of the vehicle and the end point/pose of the vehicle. A pose can include the coordinate position of the vehicle and the orientation or heading of the vehicle. The line may be defined within a two-dimensional representation of the driving surface or in a three-dimensional representation of the environment surrounding the vehicle. The line may have a corresponding length. Different portions or segments of the line may have different curvatures. The line may have an associated directionality. A trajectory may be multidimensional. Besides including a line, a trajectory may include higher order derivatives such as velocity, acceleration, curvature, curvature rate, etc.

The operations of perception, prediction, planning, and control of an AV may be implemented using a combination of hardware and software components. For instance, an AV stack performing the perception, prediction, planning, and control may be implemented as software code or firmware code. The AV stack (the software and/or firmware code) may be executed on one or more processor(s) (e.g., general processors, central processors (CPUs), graphical processors (GPUs), digital signal processors (DSPs), ASIC, etc.) and/or any other hardware processing components on the AV. Additionally, the AV stack may communicate with various hardware components (e.g., on-board sensors and control system of the AV) and/or with an AV infrastructure over a network.

Overview

The planning stack may be designed to operate under a wide range of diverse scenarios in the real-world. Also, the planning stack may be designed to generate output plans differently in response to the diverse scenarios. One paradigm for implementing a planning stack is to provide a number of different motion planners that are specialized in generating output plans for completing different tasks or achieving different goals. The motion planners may generate output plans based on different sets of constraints. In many cases, a single motion planner would be in control of the AV at a given point in time. Depending on the task to be performed and/or whether the AV is in a degraded state, the control of the AV may be exercised by a motion planner dedicated to performing the task or a motion planner that is to be used when the AV is in a degraded state. A degraded state can mean that a portion of the AV may not be operating as expected or normally. An AV may be in one of several degraded states, where operational status may differ between different degraded states (extent of degradation in operation may differ). Sometimes, control of the AV can be transitioned or transferred between different motion planners. By design, the different motion planners are not necessarily aware of the other planners.

During normal driving, the AV may utilize a structured planner that has strict constraints. The structured planner may take into account semantic map information (e.g., lane information, curb information, etc.) and strictly adhere to lane boundaries, road boundaries, or curb boundaries. The structured planner may have buffer constraints that prevent the AV from being able to drive through narrow gaps. The structured planner may not be able to produce a plan if there are flickering objects and could prevent the AV from navigating around the flickering objects.

It may be desirable for a remote agent (referred herein as an advisor or a remote advisor) to request an autonomous vehicle to relocate to a target relocation pose using a freespace planner that has fewer constraints than the structured planner that is used for normal driving. For example, the autonomous vehicle may be stuck because the structured planner is unable to produce an output plan to the next target pose, due to the limitations or constraints of the structured planner. The freespace planner, separate from the structured planner, can generate and produce output plans based on different constraints. The freespace planner may search for the shortest collision-free path from the AV's current pose to a target pose within the freespace. The freespace planner may treat certain areas, except for obstacles (or occupied space), as drivable areas or freespace, even if the areas are not considered drivable if semantic map information was taken into account. Therefore, the freespace planner may have an opportunity to generate an output plan to help the AV become unstuck.

Giving a remote requestor access to the freespace planner and implementing handoffs between planners in the planning stack to execute relocation to a target pose are not trivial tasks.

To offer remote access to relocation of an AV, the autonomous vehicle planning stack can include a remote vehicle interface. The remote vehicle interface can serve as the application programming interface for remote requestors such as a remote assistance platform, to request relocation of the autonomous vehicle. The remote vehicle interface can abstract the underlying details in the planning stack from the remote requestors and make use of the freespace planner to complete relocation of the vehicle. Other remote requestors may include a facility manager that manages a fleet of vehicles in a facility and wishes to relocate many AVs in freespace in tandem. One additional benefit of the remote vehicle interface is that improvements in the freespace planner or addition of new planners can be done without impacting the relocation workflow from the point of view of the remote requestors.

To execute relocation successfully on the vehicle, the remote vehicle interface may implement a relocation state machine to keep track of different parts or steps of a relocation session. The relocation state machine can have states that correspond to different parts or steps of a relocation session. The remote vehicle interface can receive relocation commands and/or vehicle events and transition the relocation state machine to different states based on the commands and/or events. States can include inactive, awaiting pose, paused, and moving. States can further include engaging and disengaging. The relocation state machine can ensure that (valid) state transitions between states are allowed and/or only performed in response to specific relocation commands and/or vehicle events. In other words, the relocation state machine can enforce a sequence of actions to be performed in the planning stack to ensure that relocation can occur successfully. The relocation state machine can ensure that relocation cannot be engaged if certain events are occurring. The relocation state machine can ensure that relocation may be disengaged if certain events are occurring.

The state of the relocation state machine can be published at every tick. Tick may be a clock cycle at which information may be published, where the information may be updated at a certain frequency or cadence. Certain vehicle events may prevent the state of the relocation state machine from transitioning to an engaging state. Subscribers to the state can take action according to the state of the relocation state machine.

A scenario manager may subscribe to the state of the relocation state machine to perform actions in the planning stack corresponding to the different states. Based on the state, the scenario manager can generate appropriate scenarios and engage appropriate planners based on the state.

The scenario manager may arbitrate between other scenarios being triggered by other input sources. Based on the state of the relocation state machine, the scenario manager may request the freespace planner to generate an output plan for the target relocation pose. If an output plan can be determined by the freespace planner, the scenario manager can provide the output plan as scenario evaluation feedback from the freespace planner to the remote vehicle interface. The scenario manager may determine from the state of the relocation state machine that the output plan is accepted by the requestor and is allowed by the requestor to be executed. The scenario manager can determine an appropriate motion planner to carry out the output plan and may orchestrate handoffs between different motion planners to relocate the autonomous vehicle to ensure the output plan can be executed. The scenario manager may engage with a stay still planner when transitioning between a structured planner and a freespace planner. The stay still planner may keep the AV stationary while the scenario manager transitions between the structured planner and the freespace planner. The scenario manager may control an interface to select the output plan generated by the motion planner that is in control of the AV, such that the selected output plan can be provided to the vehicle control stack.

Various embodiments herein and their advantages may apply to a wide range of vehicles (e.g., semi-autonomous vehicles, vehicles with driver-assist functionalities, etc.), and not just AVs.

Exemplary Remote Requestors and Their Interactions with the AV Stack

FIG. 1 illustrates exemplary remote requestors, a planning stack 112, and a vehicle control stack 110, according to some aspects of the disclosed technology. A remote requestor (or requestor system) may send requests to relocate AV 130. Requestors can be physically remote (or physically located remotely) from AV 130. Requestors may communicate with the AV 130 over a network. To relocate AV 130, a remote requestor may submit a relocation request or relocation command, e.g., over a network, preferably over a secured communication channel, to the planning stack 112. In response to the relocation request or relocation command, planning stack 112 may generate an output plan for vehicle control stack 110 to execute relocation.

Exemplary remote requestors can include remote assistance 132, and facility manager 134. Remote assistance 132 may be part of a remote assistance platform, where remote advisors may be trained to assist AVs such as AV 130 remotely using remote assistance 132. Remote advisors may use remote assistance 132 to have a remote assistance call session with passenger(s) of AV 130. Remote advisors may use remote assistance 132 to remotely monitor or observe the AV 130. Remote advisors may use remote assistance 132 to speak with a law enforcement officer outside of AV 130. Remote assistance 132 may perform diagnostics on the hardware and/or software of the AV 130. Remote advisors may use remote assistance 132 to remotely control AV 130 to perform actions such as relocating the AV to a desired target pose, shutting down the AV, causing the AV to reach a minimal risk condition, turning on vehicle signal lights of the AV, triggering the AV to enter a degraded state, etc. In some cases, an algorithm in remote assistance 132 may remotely control AV 130 to perform the same or similar actions. The algorithm may generate the desired target poses for AV 130 (e.g., based on information such as sensor data captured by the AV 130, contextual information about the AV, information about the environment of the AV, and information about the AV, information about the passenger, etc.) and generate relocation requests or commands to those desired target poses. The algorithm may operate with minimal to no human intervention or input. Facility manager 134 may transmit relocation requests or commands to relocate AVs in a fleet of AVs in a facility (e.g., garage, outdoor lot, parking lot, open field, etc.). A human fleet manager may input desired target poses for various AVs in a fleet. An algorithm implemented in facility manager 134 may generate desired target poses for various AVs based on tasks scheduled to be performed to the AVs and facility space/resource availability. The algorithm may operate with minimal to no human intervention or input. The algorithm may generate the relocation requests or commands to the desired target poses. Facility manager 134 may relocate many AVs in a fleet in tandem by sending relocation requests or commands to the AVs in the fleet. The relocation requests or commands can instruct the AVs to relocate to different desired target poses in the facility. Both remote assistance 132 and facility manager 134 are examples of remote requestors that may benefit from being able to relocate AV 130, and potentially make use of one or more other motion planners that have different driving goals or constraints to relocate AV 130.

The planning stack 112 can include the remote vehicle interface 170, a scenario manager 150, a plurality of motion planners 152, and an interface 108. The remote vehicle interface 170 may serve as the application programming interface that allows different remote requestors to submit relocation requests. Remote requestors can use remote vehicle interface 170 to request relocation of AV 130. The remote vehicle interface 170 can translate the relocation requests or commands and cause the scenario manager 150 to execute the relocation requests. The remote vehicle interface 170 thus abstracts the underlying details in the planning stack 112 from the remote requestors and separates the concerns of between the remote requestors interested in requesting relocation and scenario manager 150 and motion planners 152 that are executing the relocation in the planning stack 112. The remote vehicle interface 170 enables servicing of relocation requests or commands made by different kinds of remote requestors, as long as the remote requestors can use the application programming interface defined by the remote vehicle interface 170. Having an application programming interface can mean that updates and improvements to the motion planners (e.g., updates to the individual motion planners and addition of new planners) would not impact the remote requestors requesting relocation.

Scenario manager 150 may receive relocation state information from remote vehicle interface 170 and requests from other input sources 160. Other input sources 160 may include a mission manager that receives missions (e.g., "take me to this address", "return to facility and charge", "go to this waypoint to pick-up a package", etc.) from ridehailing/ridesharing platform, a customer of the platform, or fleet management platform. Scenario manager 150 may arbitrate or prioritize different incoming information or requests to determine which scenario to service/evaluate for execution by a downstream motion planner. In some cases, scenario manager 150 may determine that a relocation request or scenario has higher priority against other incoming requests or scenarios, and in response to the determination, services/evaluates the relocation request or scenario.

Scenario manager 150 may operate within a primary stack (e.g., for normal driving, for when the AV 130 is in a normal, non-degraded state) and can manage different motion planners of motion planners 152. Depending on the scenario being evaluated by scenario manager 150 (e.g., scenario may correspond to different tasks to be performed by AV 130 or different driving goals/objectives to be achieved by AV 130), scenario manager 150 may select one of the motion planners in motion planners 152 to take control of AV 130. Exemplary motion planners may include structured planner 102, stay still planner 104, and freespace planner 106. It is envisioned that other planners may be included in motion planners 152. Motion planners can generate output plans for different scenarios, tasks, or goals. Because motion planners may operate differently and may have different constraints/limitations, some motion planners may be preferred for certain scenarios, tasks, or goals. Scenario manager 150 may determine which motion planner is to control AV 130 (in other words, an output plan generated by the appropriate motion planner is the output plan provided to vehicle control stack 110). Scenario manager 150 may determine that a stay still planner is to be used when transitioning between structured planner 102 and freespace planner 106. Scenario manager 150 may determine that freespace planner 106 is to be used when moving AV 130 to a target relocation pose.

Structured planner 102 may be specialized in generating paths for the AV in structured, nominal driving (e.g., tasks or scenarios that involve the AV driving forward and/or backwards). Structured, nominal driving may involve path planning based on semantic map information, such as a detailed, lane-level map, and detected objects of the AV's surroundings. Stay still planner 104 may be specialized in producing output plans that involve the AV staying still or maintaining a very low speed (close to zero). Freespace planner 106 may be specialized in generating paths for the AV in unstructured, freespace driving. Unstructured, freespace driving may involve collision-free and safe path planning based on sensor data and potentially without a detailed, lane-level map of the AV's surroundings. Another exemplary motion planner may be specialized in generating paths for the AV to drive in reverse. Other exemplary motion planners may be specialized in generating paths for completing other tasks such as: parking, maneuvering around inside a building structure, pulling over, driving on a highway, driving on a freeway, driving off-road, driving in inclement weather conditions, etc.

In some cases, for relocating AV 130, it may be beneficial to utilize freespace planner 106 to generate an output plan for AV 130 (as opposed to structured planner 102). The freespace planner 106 may use a graph-based path planning or path finding algorithm (e.g., Dijkstra, A*, RIPA, Sample, etc.) to generate collision-free kinematically feasible paths. The algorithm used in freespace planner 106 may be different from the algorithm used in structured planner 102. Path planning may find an optimal feasible path, based on one or more metrics. Path planning may find the shortest feasible path. In some cases, path planning may find the most comfortable feasible path. In some cases, path planning may find the safest feasible path. Freespace planner 106 may generate paths without constraints such as remaining within lane lines, not driving on a curb, following traffic signals, abiding by structured rules in structured planner 102, etc. Freespace planner 106 may be controllable (e.g., through information provided by scenario manager 150, and depending on the relocation request) to operate in different expert modes where some constraints may be enabled or disabled when freespace planner 106 is searching for feasible paths. Expert modes may include modes where advisors having different levels of expertise or experience with relocation may be authorized to ignore certain constraints or information. For instance, freespace planner 106 may be instructed to ignore information from camera feeds. Freespace planner 106 may be instructed to ignore information from range sensor feeds. Freespace planner 106 may be instructed to ignore inferences from the perception stack. Freespace planner 106 may be instructed to ignore inferences from the prediction stack.

In some embodiments, when scenario manager 150 is evaluating and/or servicing relocation commands from remote vehicle interface 170, scenario manager 150 may coordinate communicating with different motion planners in motion planners 152 to compute output plans and coordinate handoff between different motion planners to successfully perform relocation of the AV 130.

In some cases, the planning stack may include a watchdog 118, a fallback manager 120, and a secondary stack 122. Watchdog 118 may monitor for and publish state of fault conditions or faults occurring on AV 130. Fallback manager 120 may trigger AV 130, based on the fault conditions and/or faults, to enter a degraded state (or one of many degraded states), and cause a secondary stack 122 (or other stacks, if appropriate) to take control of AV 130. Secondary stack 122 and other stacks may provide redundancy and failsafe mechanisms for AV 130 to operate safely even if the AV 130 may encounter one or more fault conditions or faults. Secondary stack 122 and other stacks may perform driving maneuvers to bring AV 130 to a minimal risk condition (e.g., pulling over and coming to a stop gracefully and safely, slowly decelerating to come to a stop, etc.). Secondary stack 122 or other stacks may use different sensors to generate output plans. Other stacks may be included for different degraded states of AV 130. Secondary stack 122 or other stacks may be orthogonal to the primary stack. For example, secondary stack 122 may have orthogonal dependencies than the primary stack. Secondary stack 122 may depend on one type of sensor data only, whereas the primary stack may depend on other types or additional types of sensor data. Secondary stack 122 may include different algorithms or methodologies for producing a plan for the AV 130. Orthogonality can mean that the dependencies do not overlap with each other or are different from each other, so that faults occurring in a first stack may be less likely to occur in a second stack whose dependencies are orthogonal to the dependencies of the first stack. Secondary stack 122 may be implemented on different hardware than the primary stack. In some cases, watchdog 118 and/or fallback manager 120 may be external to planning stack 112.

Interface 108 may receive control signals from scenario manager 150 and/or fallback manager 120 that enables interface 108 to select the appropriate output plan from various output plans being generated by the upstream motion planners and/or secondary stack 122, generally referred herein as output plan generators. In some cases, the interface 108 may validate the output plan to ensure that the output plan can be executed by vehicle control stack 110. The selected output plan is then provided to vehicle control stack 110 to control AV 130 and carry out the selected output plan. All output plan generators (e.g., motion planners 152 and secondary stack 122) in the planning stack 112 can use interface 108 to interface with the vehicle control stack 110. For instance, motion planners 152 may use interface 108 to specify (reference) plans and may submit other vehicle hardware control requests such as gear shifting or blinkers/hazards light changes. The interface 108 can ensure consistency in time and across different output plan generators. Interface 108 can optionally arbitrate conflicts or inconsistencies in time and across different output plan generators. Interface 108 can manage any number of upstream output plan generators. Additionally, with interface 108 managing the plans being produced by output plan generators, the vehicle control stack 110 may receive and consume a single data stream, regardless of which output plan generator is in control or is active.

The vehicle control stack 110, e.g., software vehicle controls, can receive output plans generated by the planning stack 112 upstream of the vehicle control stack 110. Vehicle control stack 110 can generate (vehicle actuator or vehicle hardware control) commands to control vehicle hardware controls of AV 130 based on the received output plans. Vehicle hardware controls can include actuators of the AV 130. Examples of vehicle hardware controls of AV 130 may include: vehicle gear control, vehicle blinker light control, vehicle hazard light control, vehicle steering control, vehicle brake control (which can include electronic parking brake control and/or wheel brake control), vehicle motor controls, and vehicle horn control. Vehicle control stack 110 can send (actuator) commands to vehicle hardware controls to cause a gear of AV 130 to change, cause the AV 130 to brake, cause the AV 130 to turn steering by a certain amount, cause the AV 130 to accelerate by a certain amount, cause the horn of the AV 130 to honk, etc.

In some embodiments, vehicle control stack 110 may include a path follower (PF) 180 and low-level controls (LLC) 190. Path follower 180 may generate a local path for the vehicle to take. The local path may be optimized based on tracking error of the local path relative to a reference trajectory in the output plan received from interface 108. The local path may include a corrective action to get the AV 130 to converge on and stick to the reference trajectory of the received plan when the AV deviates from the reference trajectory. Path follower 180 may produce a local path that follows the reference trajectory of the received plan as closely as possible, given certain constraint(s). Constraints can include: comfort, speed, feasibility, lateral acceleration, curvature, curvature rate, lateral jerk, etc. Low-level controls 190 may generate commands, such as actuator commands, to the vehicle hardware controls based on the local path produced by path follower 180. For instance, low-level controls 190 may translate the local path into, e.g., engine torque, braking torque, steering wheel angle, transmission request, and electronic parking brake request for the vehicle hardware controls. Low-level controls 190 may determine desired gear and produce gear control commands to change the gear of the vehicle. Low-level controls 190 may determine whether left/right blinker lights or hazard lights are to be turned on and produce commands to turn on the left/right blinker lights or hazard lights.

Exemplary Remote Vehicle Interface and Exemplary Scenario Manager

Figure 2:
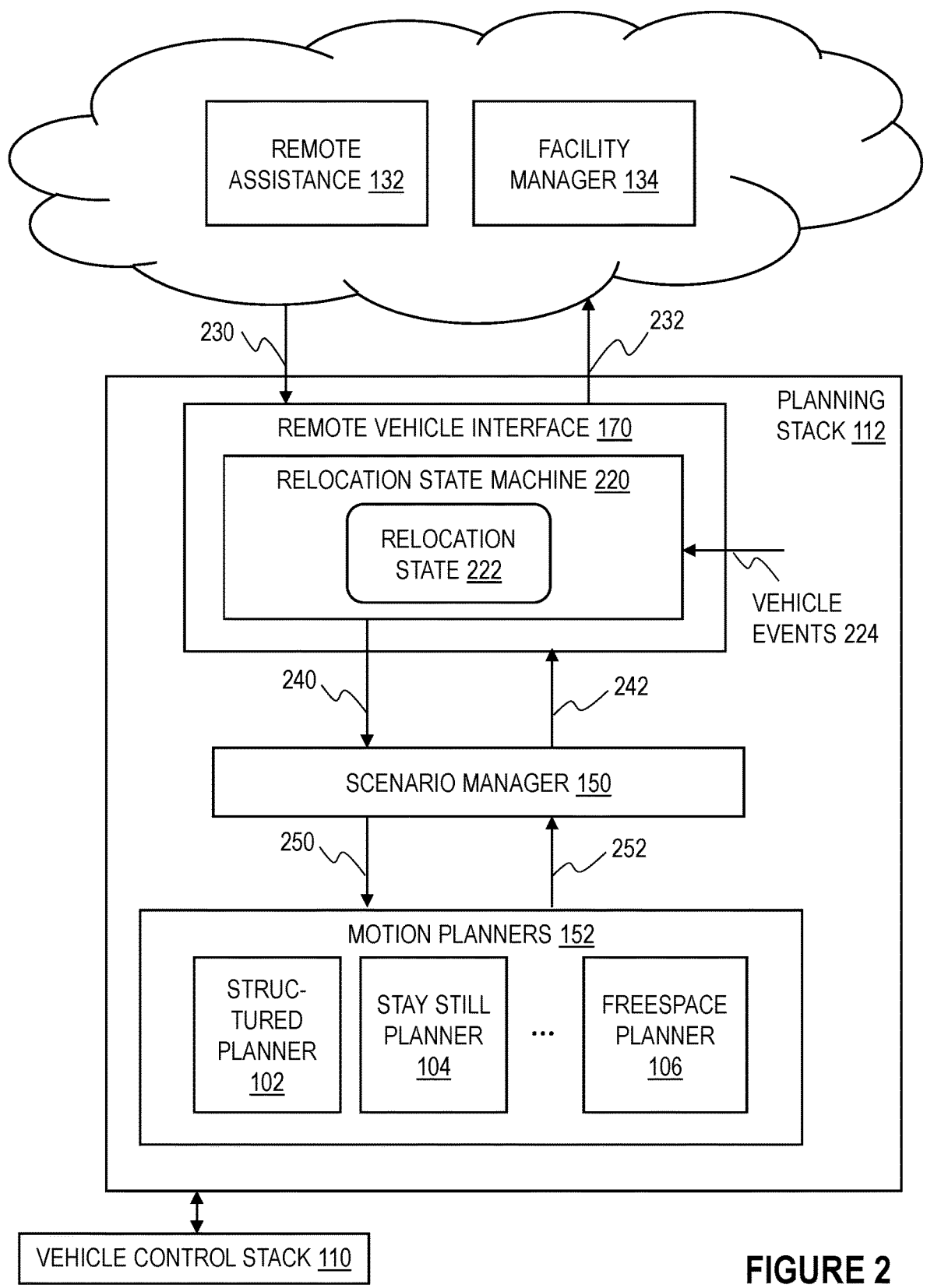
FIG. 2 illustrates exemplary remote requestors, a remote vehicle interface, a scenario manager, motion planners, vehicle control stack, and information flowing between them, according to some aspects of the disclosed technology.

FIG. 2 illustrates exemplary remote requestors, a remote vehicle interface 170, a scenario manager 150, motion planners 152, vehicle control stack 110, and information flowing between them, according to some aspects of the disclosed technology. Herein, arrows are meant to illustrate direction of information flow, and do not necessarily imply that there is a discrete communication link or communication path between entities in the figures. Information may flow from one entity to another through transfer of data from a sender entity to a receiver entity, e.g., in the form of a message from the sender entity to the receiver entity. Information may flow from one entity to another entity through data topics, where a publisher entity may send the information by publishing the information to data topics, and a subscriber entity may receive the information by subscribing to the data topics. The use of data topics means that one or more publisher entities can publish information, and one or more subscribers can subscribe to the information.

As described with FIG. 1, motion planners 152 may include a structured planner 102, stay still planner 104, and freespace planner 106. In particular, the freespace planner 106 may have different, or fewer constraints than the structured planner 102. Constraints may be rules or limitations that are applied by a motion planner when the motion planner is searching for or determining a feasible output plan or path. The rules or limitations may impact what is considered a feasible output plan or path. The rules or limitations may impact the available output plans or path to choose from when searching for a feasible, optimal output plan or path. Constraints may include search constraints of the motion planner. Without strict adherence to lane boundaries, the freespace planner 106 may assist an AV by finding a feasible path for the AV to navigate through unusual traffic situations. Using the freespace planner 106 as a backup motion planner may be particularly useful when the structured planner 102 is unable to produce an output plan. Some unusual traffic situations (e.g., situations involving temporary traffic restrictions such as traffic cones or barricades) may necessitate driving in a lane that is not allowed by structured planner 102, or driving on a curb that is not allowed by structured planner 102. With more relaxed buffer/distance constraints, the freespace planner 106 may find a feasible path for the AV to drive through narrower gaps than what is allowed by the structured planner 102. With less limitations, a remote advisor or an algorithm may choose or try target relocation poses for an AV to get around phantom objects and attempt to generate an alternative path that would not have been feasible with the structured planner 102 and prevent the structured planner 102 from reverting back to the path that the structured planner 102 refuses to execute due to the phantom object. Freespace planner 106 can serve as a backup or alternative motion planner to help get an AV unstuck in certain special, time-limited situations. Freespace planner 106 is not intended to be used for normal driving. In some embodiments, the structured planner 102 can produce plans to avoid collisions with obstacles and accounts for semantic map information, and the freespace planner 106 can produce plans to avoid collisions with obstacles and does not account for semantic map information.

Remote vehicle interface 170 may receive relocation commands as part of arrow 230 from one of the remote requestors, e.g., remote assistance 132 and facility manager 134. The relocation commands may be defined by an application programming interface of the remote vehicle interface 170. Exemplary relocation commands, in accordance with the application programming interface of remote vehicle interface 170, may include:

A start relocation request: a request that may initiate or start a relocation session and indicates that a requestor wishes to relocate the AV. The AV may enter a relocation mode. The request may include metadata identifying the relocation session.

A generate relocation solution request: a request that may request an AV (e.g., freespace planner 106) to generate/compute an output plan based on and towards a target relocation pose. The AV may not execute the path, but only generate/compute the path. The AV may return or publish the path so that the path can be provided to a remote requestor for visualization. The request may include metadata identifying the relocation session and target relocation pose information. Optionally, the request may include a unique target relocation pose identifier identifying the target relocation pose. The target relocation pose identifier can be echoed by the AV to allow the remote requestor to verify that the AV is evaluating the remote requestor's most recent request. The target relocation pose identifier can help disambiguate race conditions if the remote requestor sends multiple commands in rapid succession.

An execute relocation solution request: a request that may request an AV (e.g., freespace planner 106) to implement the generated/computed path to move the AV towards the target relocation pose. The request may include metadata identifying the relocation session and an execution type value.

A reset relocation solution request: a request that may ask the AV to clear its current target relocation pose as previously specified by the generate relocation solution request. The request may include metadata identifying the relocation session.

A stop relocation solution request: a request that may ask the AV to stop or end the relocation session. The AV may exit the relocation mode. The request may include metadata identifying the relocation session.

Figure 3:
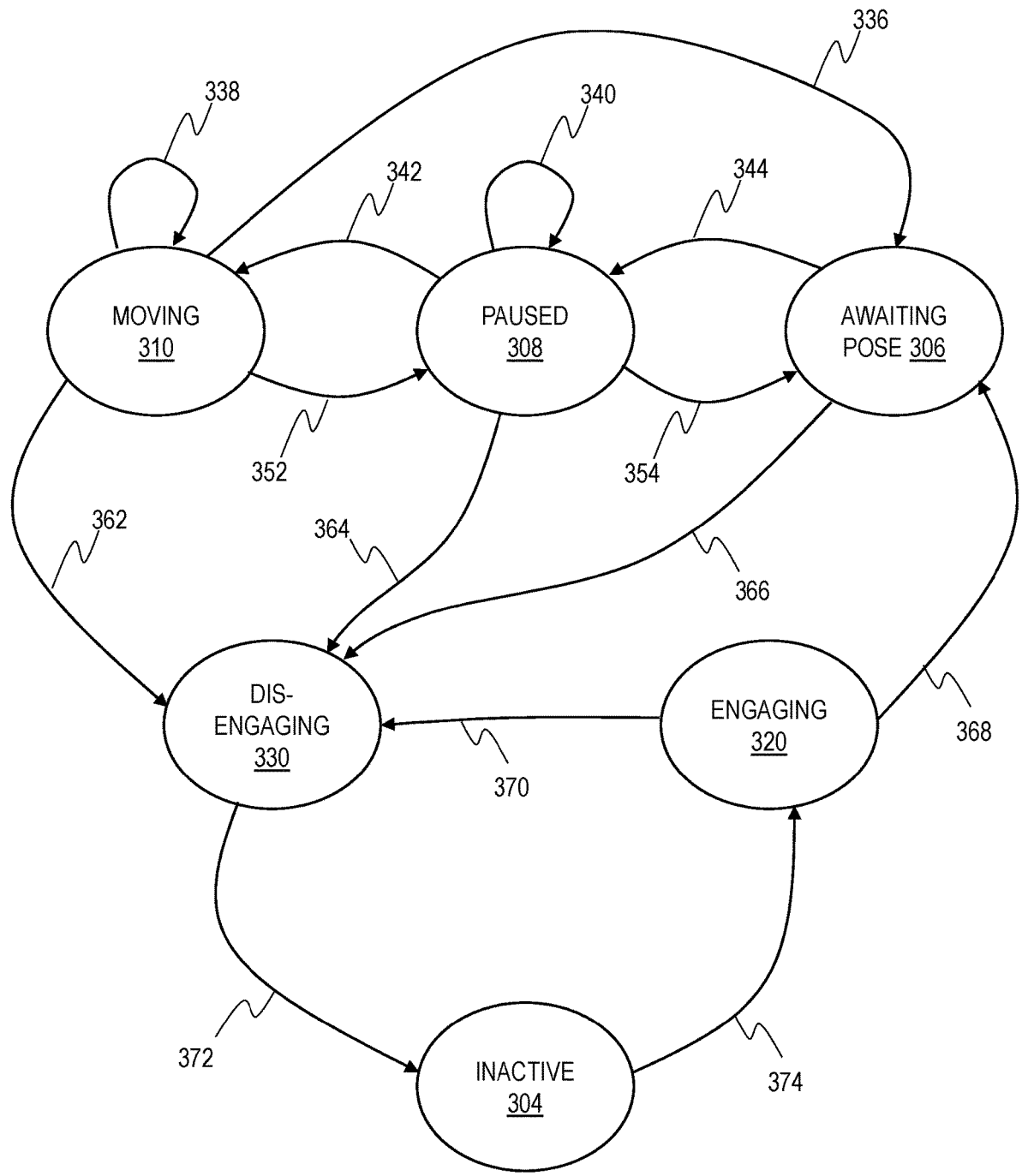
FIG. 3 illustrates an exemplary state machine transition diagram, according to some aspects of the disclosed technology.

Remote vehicle interface 170 may include a relocation state machine 220. Relocation state machine 220 may be a finite state machine. Relocation state machine 220 may have different states. States can include one or more of: inactive or INACTIVE, awaiting pose or AWAITING_POSE, paused or PAUSED, and moving or MOVING. States can further include engaging or ENGAGING, and disengaging or DISENGAGING. An exemplary implementation of states and state transitions of relocation state machine 220 is illustrated in FIG. 3. Remote vehicle interface 170 may update the relocation state machine (e.g., change states or transition states) based on received relocation commands. Remote vehicle interface 170 may update the relocation state machine (e.g., change states or transition states) based on vehicle events 224 (e.g., events which are happening to or in the AV). Remote vehicle interface 170 may update the relocation state machine (e.g., change states or transition states) based on timeouts.

Remote vehicle interface 170 may publish a relocation state 222 to subscribers to the relocation state 222. In some examples, remote vehicle interface 170 may publish relocation state 222 as part of arrow 240 to the scenario manager 150. In some examples, remote vehicle interface 170 may publish relocation state 222 as part of arrow 232 to a requestor. Remote vehicle interface 170 may publish a current state of the relocation state machine (e.g., the relocation state 222). The remote vehicle interface 170 may publish one or more state transition failure reasons of the relocation state machine 220. The remote vehicle interface 170 may publish a target relocation pose of the vehicle. The remote vehicle interface 170 may publish an identifier of the relocation session. The remote vehicle interface 170 may publish an indication that a relocation state 222 of the relocation state machine 220 changed for a current tick.

Scenario manager 150 may generate a relocation scenario based on the relocation state 222. Scenario manager 150 may appropriately transition between different motion planners in motion planners 152 and determine which motion planner is to be in control of the AV. In some cases, scenario manager 150 may communicate with motion planners (as illustrated by arrow 250 and arrow 252) through an application programming interface. The application programming interface may include messaging between the scenario manager 150 and the motion planners 152. The application programming interface may include data topics for publishing and subscribing to information. Scenario manager 150 may publish information to data topics that correspond to different motion planners, and the motion planners may subscribe to information made available on respective data topics. Motion planners 152 may publish information to scenario manager 150 via respective evaluation data topics to which the scenario manager 150 is subscribed. Scenario manager 150 may publish information to a structured planner data topic to which structured planner 102 is subscribed. Structured planner 102 can publish information to a structured planner evaluation data topic to which the scenario manager 150 is subscribed. Scenario manager 150 may publish information to a stay still planner data topic to which stay still planner 104 is subscribed. Stay still planner 104 can publish information to a stay still planner evaluation data topic to which the scenario manager 150 is subscribed. Scenario manager 150 may publish information to a freespace planner data topic to which freespace planner 106 is subscribed. Freespace planner 106 can publish information to a freespace planner evaluation data topic to which the scenario manager 150 is subscribed.

If scenario manager 150 determines that a particular motion planner is to control the AV, scenario manager 150 may publish a scenario to the target motion planner (e.g., in arrow 250) to request the target motion planner to determine whether the scenario can be executed. The target motion planner can reply with a scenario evaluation message to provide feedback information to scenario manager 150 (e.g., in arrow 252) indicating whether the proposed scenario would be successful or not. The target motion planner can publish the scenario evaluation message to a corresponding motion planner evaluation data topic to which the scenario manager 150 is subscribed. If the scenario manager 150 confirms that the target motion planner can execute the proposed scenario based on the scenario evaluation message, the scenario manager 150 can determine that the target motion planner is in control or is the active planner (e.g., ensures that the output plan generated by the target motion planner is provided to the vehicle control stack 110).

In some cases, scenario manager 150 may receive relocation requests and other incoming requests and generate different scenarios in response to the requests. Scenario manager 150 may evaluate priorities of the different scenarios (e.g., a stay still scenario, a relocation scenario, etc.). Scenario manager 150 can determine that the relocation scenario has the highest priority over other scenarios being evaluated in scenario manager. Upon determining that the relocation scenario has the highest priority, scenario manager 150 may evaluate the relocation scenario, and publish the relocation scenario to the appropriate motion planner, e.g., freespace planner 106.

When performing relocation, scenario manager 150 may receive a target relocation pose from a remote requestor in a relocation command sent via arrow 230. The scenario manager 150 may generate the relocation scenario based on the received target relocation pose. Scenario manager 150 may publish the relocation scenario in arrow 250 to the freespace planner 106.

Scenario manager 150 may receive scenario evaluation feedback from the motion planners 152. In response to receiving a scenario, a target motion planner can evaluate the scenario and send scenario evaluation feedback to scenario manager 150. For example, in response to receiving a relocation scenario, the freespace planner 106 can evaluate the relocation scenario and provide scenario evaluation feedback from the freespace planner 106 to the scenario manager 150. The freespace planner 106 may, if an output plan is feasible (e.g., the relocation scenario is considered successful), compute or generate an output plan that can take the AV to the target relocation pose. The freespace planner 106 may provide, in arrow 252, scenario evaluation feedback that includes path information in the output plan from the freespace planner 106.

Freespace planner 106 can provide information in the scenario evaluation feedback in arrow 252 to offer feedback to the requestor. The scenario evaluation feedback or a derivation thereof may flow, via scenario manager 150 and remote vehicle interface 170, to requestor as feedback for the relocation session. In some cases, the scenario evaluation feedback includes the path information of the output plan so that the requestor can visualize the path (e.g., requestor can generate a visualization of the path in a graphical user interface) computed by the freespace planner. The freespace planner 106 may, if an output plan is not feasible (e.g., the relocation scenario is not considered successful), provide in arrow 252 an indication that no output plan can be determined for the given target relocation pose as the scenario evaluation feedback. The requestor may, in response to the scenario evaluation feedback, attempt a different target relocation pose. In some cases, the scenario evaluation feedback in arrow 252 may include an indication that a position of a given target relocation pose is achieved in the output plan but not an orientation of the given target relocation pose (e.g., the orientation is not achievable within a certain threshold). The requestor may, in response to the scenario evaluation feedback, attempt a different target relocation pose (adjusting position and/or orientation). In some cases, the scenario evaluation feedback in arrow 252 may include an indication that an imminent collision is predicted. In some cases, the scenario evaluation feedback in arrow 252 may include an indication that an imminent collision is predicted and path information for a new collision-free output plan. The requestor may, in response to the scenario evaluation feedback, authorize the new collision-free output plan. In some cases, the scenario evaluation feedback in arrow 252 may include alternative or multiple (feasible) output plans executable by the vehicle control stack. The requestor may, in response to the scenario evaluation feedback, select and authorize a preferred output plan among the output plans to be executed. In some cases, the scenario evaluation feedback in arrow 252 may include multiple output plans executable by the vehicle control stack that correspond to requestors with different levels of expert level or requestors operating with different expert modes. The requestor may, in response to the scenario evaluation feedback, confirm that the requestor is authorized to execute a preferred output plan, and request/authorize the preferred output plan among the output plans to be executed.

The scenario manager 150 may provide scenario evaluation feedback or a derivation thereof to remote vehicle interface 170 via arrow 242. The scenario evaluation feedback or derivation thereof may include a computed output plan. In some cases, remote vehicle interface 170 may provide path information in the output plan from the freespace planner 106 to a requestor so that the requestor can visualize the path.

The remote vehicle interface 170 may provide vehicle state information in arrow 232 to remote requestors. Examples of vehicle state information in arrow 232 may include one or more of:

Scenario evaluation feedback or a derivation thereof.
Relocation state 222.
Whether the relocation state 222 has been updated in the current tick.
Whether a change in states failed in the relocation state machine 220.
A reason why a change in states failed in the relocation state machine 220.
Whether a timeout condition has occurred.
A state of a relocation session.
Sensor data feeds of the AV to allow requestors to perceive and view the sensor data (camera data).
Map information of the environment of the AV and tracked objects or detected obstacles placed on the map.
Perception information of the environment of the AV.
Prediction information of the environment of the AV.
Fault conditions or faults that the AV has.
Vehicle events 224.
Current pose of the AV.
Current gear of the AV.
Current speed of the AV.

In some cases, during a relocation session, freespace planner 106 can subscribe to a freespace planner data topic to get the latest relocation scenario from (or published by) scenario manager 150. Upon receiving the latest relocation scenario, the freespace planner 106 can compute and propose an output plan for the relocation scenario. If an output plan is accepted by the requestor, and starts to execute, then the accepted output plan can be locked-in. Subsequently computed output plans may deviate at most a certain small distance (e.g., 50 cm) from the locked-in accepted output plan to prevent any dramatic change in the movement of the AV. During the execution of an output plan, the freespace planner 106 may check whether a collision is predicted. If a collision is predicted along the output plan, the freespace planner 106 can change the output plan to stop the AV immediately. The freespace planner 106 can resume executing the output plan if the predicted collision is cleared, or the freespace planner 106 can propose a new collision-free output plan. The freespace planner 106 can propose the new collision-free output plan if the requestor stops authorizing the current output plan.

In the event that the relocation state machine fails to transition states, fails to execute a relocation command, or encounters some other failure, the relocation state machine may publish information about the failure. The information about the failure may be published to the requestor (e.g., via arrow 232) for context and understanding. The requestor may display the failure to an advisor via a graphical user interface. Examples of information about the failure may include:

The vehicle event that prevented a state transition.
An invalid state transition was requested or attempted.
The AV is within the vicinity of an intersection or in an intersection.
The target relocation heading is invalid (greater than a certain number of degrees deviation from the current heading of the AV).
The target position is invalid (too far away or greater than a certain distance threshold from the current position of AV).
Motion planner was unable to find a feasible output plan.
Output plan generated by a motion planner may cause the AV to enter an intersection.
Scenario manager was unable to give control to another motion planner.

Scenario manager was unable to give control to a freespace planner.

Scenario manager was unable to give control to a structured planner.

Scenario manager was unable to give control to a stay still planner.

In some embodiments, a stay still planner 104 is included in motion planners 152. The scenario manager 150 may put the stay still planner 104 in control of the AV when transitioning in between structured planner 102 and freespace planner 106. The scenario manager 150 may generate a stay still scenario based on the relocation state 222 (or upon determining that a transition between structured planner 102 and freespace planner 106 is in order). The scenario manager 150 may publish the stay still scenario to the stay still planner 104, e.g., before transitioning to structured planner 102 or freespace planner 106. A benefit of having the stay still planner 104 is to keep the AV stationary while transitions between different motion planners are occurring.

A vehicle control stack 110 may receive an output plan from the freespace planner 106 (or a motion planner that is in control), and to output commands to the vehicle hardware controls to carry out the received output plan. Transitioning control between motion planners, in response to state transitions of the relocation state machine, may be performed by scenario manager 150 sending a control signal to an interface (e.g., interface 108 of FIG. 1) in planning stack 112. Scenario manager 150 may, in response to determining that the freespace planner 106 is to control the vehicle, control an interface (e.g., interface 108 of FIG. 1) to selectively provide an output plan of the freespace planner 106 among outputs of the plurality of motion planners 152 to vehicle control stack 110. Scenario manager 150 may, in response to determining that the stay still planner 104 is to control the vehicle, control an interface (e.g., interface 108 of FIG. 1) to selectively provide an output plan of the stay still planner 104 among outputs of the plurality of motion planners 152 to vehicle control stack 110. Scenario manager 150 may, in response to determining that the structured planner 102 is to control the vehicle, control an interface (e.g., interface 108 of FIG. 1) to selectively provide an output plan of the structured planner 102 among outputs of the plurality of motion planners 152 to vehicle control stack 110.

Exemplary Relocation State Machine

FIG. 3 illustrates an exemplary state machine transition diagram for relocation state machine 220 illustrated in FIG. 2, according to some aspects of the disclosed technology. In the illustration, the relocation state machine 220 may be a finite state machine having a plurality of states. Exemplary states include one or more of: MOVING 310, PAUSED 308, AWAITING POSE 306, DISENGAGING 330, ENGAGING 320, and INACTIVE 304. Exemplary valid state transitions are shown.

States of the relocation state machine 220 correspond to different stages or steps relating to a remote relocation session. It is envisioned by the disclosure that the relocation state machine may include two or more of the states shown, and different states can be used to encode the stages/steps. INACTIVE 304 can mean that the AV is not in an active remote relocation session, and that the AV awaits for an incoming start relocation request. INACTIVE 304 can mean that the a remote relocation session is not active. AWAITING POSE 306 can mean that the AV has begun an active remote relocation session, and that the AV awaits for a pose to be specified by a remote advisor. AWAITING POSE 306 can mean that a valid relocation pose has not yet been received. Relocation state machine 220 may transition to AWAITING POSE 306 when a target relocation pose is reached. PAUSED 308 can mean that the AV is in an active remote relocation session and has received a pose, and that the AV awaits for a solution to be generated for the pose. PAUSED 308 can mean that a solution is being determined. PAUSED 308 can mean that AV is not allowed or authorized to move (yet). MOVING 310 can mean that the AV is in an active remote relocation session and has received a solution, and that the AV is executing the solution. MOVING 310 may mean that AV is allowed or authorized to move. Relocation state machine 220 may transition out of MOVING 310 state (only) after the AV decelerates to ~0 m/s. ENGAGING 320 can mean that the AV has just received an incoming start relocation request, and that the AV is transitioning to start or enter an active remote relocation session. ENGAGING 320 can mean that the active remote relocation session is starting. DISENGAGING 330 can mean that the AV has just received a stop relocation request, and that the AV is transitioning to end or exit an active remote relocation session. DISENGAGING 330 can mean that the active remote relocation session is ending, and the AV is attempting hand back to normal operation (e.g., handing back control to structured planner).

The relocation state machine may transition states in response to receiving certain relocation commands. Exemplary valid state transitions in response to certain relocation commands are shown below:

| State | Valid Relocation Command for State Transition | New State | Corresponding to State Transition Arrow in FIG. 3 |
| --- | --- | --- | --- |
| INACTIVE 304 | Start Relocation Request | ENGAGING 320 | 374 |
| AWAITING POSE 306 | Stop Relocation Request | DISENGAGING 330 | 366 |
| | Generate Relocation Solution Request | PAUSED 308 | 344 |
| PAUSED 308 | Stop Relocation Request | DISENGAGING 330 | 364 |
| | Generate Relocation Solution Request | PAUSED 308 | 340 |
| | Reset Relocation Solution Request | AWAITING POSE 306 | 354 |
| | Execute Relocation Solution Request | MOVING 310 | 342 |
| MOVING 310 | Execute Relocation Solution Request | MOVING 310 | 338 |
| | Reset Relocation Solution Request | AWAITING POSE 306 | 336 |
| | Stop Relocation Request | DISENGAGING 330 | 362 |
| | Generate Relocation Solution Request | PAUSED 308 | 352 |
| ENGAGING 320 | NONE | Not applicable | Not applicable |
| DISENGAGING 330 | NONE | Not applicable | Not applicable |

The relocation state machine may transition states in response to receiving certain vehicle events (e.g., vehicle events 224 of FIG. 2, events which are happening to or in the AV, states of scenario manager 150, which motion planner is in control, state of the vehicle, etc.). One type of such vehicle event is a relocation ending event. A relocation ending event may cause the relocation workflow to terminate (e.g., events which are outside of the requestor's control) and cause the AV to disengage from the relocation workflow. Examples of relocation ending events may include the AV no longer operating in an autonomous mode (e.g., a driver has taken control of the AV, a driver has grabbed the steering wheel of the AV), the AV encountering a fault or a fault condition, the AV entering a degraded state, etc. A relocation ending event may cause relocation state machine to transition from PAUSED 308 to transition to DISENGAGING 330 as illustrated by state transition arrow 364. Relocation ending event may cause relocation state machine to transition from MOVING 310 to transition to DISENGAGING 330 as illustrated by state transition arrow 362. Relocation ending event may cause relocation state machine to transition from AWAITING POSE 306 to transition to DISENGAGING 330 as illustrated by state transition arrow 366.

Success or failure to allow the relocation planner (e.g., freespace planner, stay still planner, etc.) to control the AV may also cause state transitions of the relocation state machine. The relocation state machine may transition from ENGAGING 320 to AWAITING POSE 306, as illustrated by arrow 368, in response to the scenario manager (e.g., scenario manager 150 of FIGS. 1-2) indicating that the relocation planner is in control. The relocation state machine may transition from DISENGAGING 330 to INACTIVE 304, as illustrated by arrow 372, in response to the scenario manager (e.g., scenario manager 150 of FIGS. 1-2) indicating that the relocation planner is not in control.

The relocation state machine may transition between INACTIVE 304 to ENGAGING 320 in response to receiving a start relocation request. Referring back to FIG. 2, the scenario manager 150 may send a stay still scenario to stay still planner 104 and transition to have the stay still planner 104 to be in control of the AV if the stay still scenario is deemed feasible by the stay still planner 104. In some embodiments, the scenario manager 150 may determine that a stay still planner 104 is to control the vehicle when the relocation state is an ENGAGING state (e.g., ENGAGING 320 in FIG. 3). The scenario manager may publish a stay still scenario to the stay still planner 104. Stay still planner 104 may execute the stay still scenario. Afterwards, the scenario manager 150 may send a relocation scenario to freespace planner 106 and transition to have the freespace planner 106 be in control of the AV if the relocation scenario is deemed feasible by the freespace planner 106.

The relocation state machine may transition between MOVING 310 to DISENGAGING 330 in response to receiving a stop relocation request. Referring back to FIG. 2, the scenario manager 150 may send a stay still scenario to stay still planner 104 and transition to have the stay still planner 104 to be in control of the AV if the stay still scenario is deemed feasible by the stay still planner 104. In some embodiments, the scenario manager 150 may determine that a stay still planner 104 is to control the vehicle when the relocation state is a DISENGAGING state (e.g., DISENGAGING 330 in FIG. 3). The scenario manager may publish a stay still scenario to the stay still planner 104. Stay still planner 104 may execute the stay still scenario. Afterwards, the scenario manager 150 may transition to have the structured planner 102 be in control of the AV.

The relocation state machine may transition states based on timeouts. For instance, if the relocation state machine remains in ENGAGING 320 over a certain period of time (e.g., 3 seconds or another suitable threshold), the relocation state machine may transition to DISENGAGING 330, as illustrated by state transition arrow 370.

The relocation state machine may prevent a state transition to ENGAGING 320 (from INACTIVE 304) if certain vehicle events are occurring. Examples of such vehicle events may include:

One or more doors of the AV are open.
The AV enters a degraded state or is in a degraded state.
The vehicle is not stationary.
The vehicle is in a minimal risk condition. Minimal risk condition can encompass a condition where an AV encounters a failure and subsequently achieves a safe state (e.g., a complete stop). Relocation may not be desirable.
The AV is actively performing a safety or fallback maneuver (e.g., pulling over gracefully, getting out of traffic).
The AV is in a degraded state.
The AV detects high network latency with back-office systems.
The AV is in an invalid gear (e.g., not in drive).

Exemplary Remote Assistance Implementation

Figure 4:
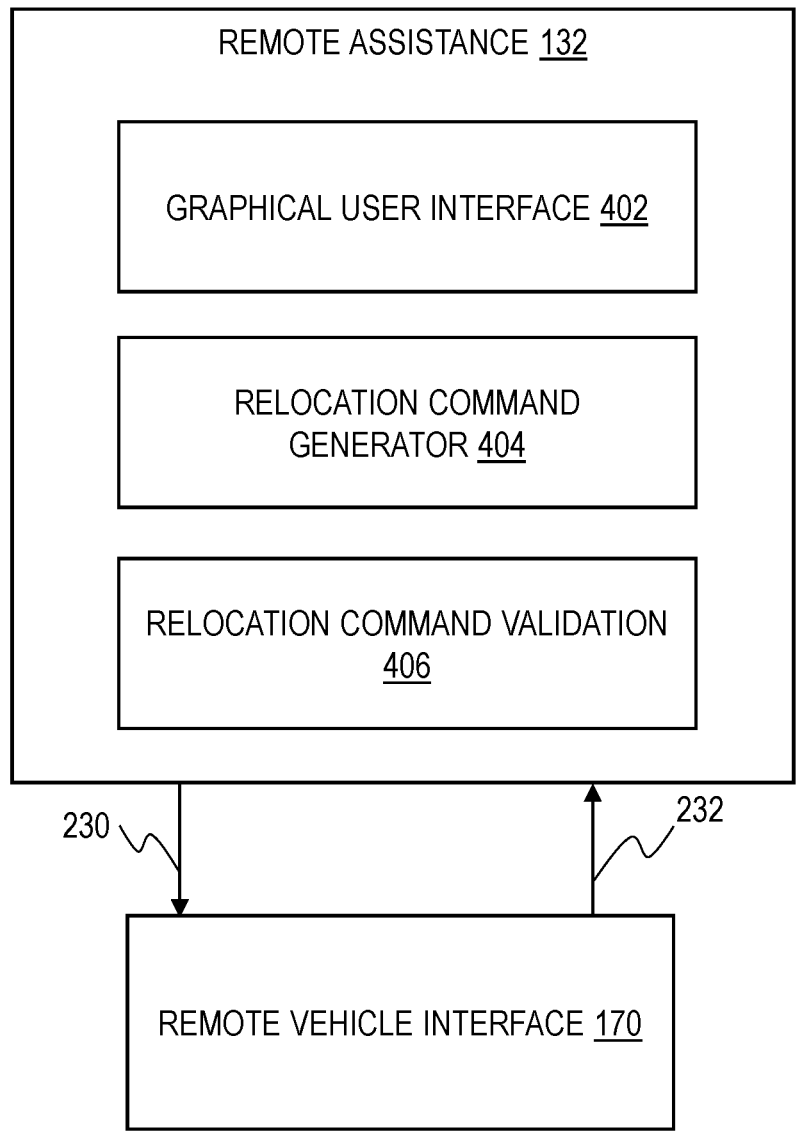
FIG. 4 illustrates remote assistance as a remote requestor and a remote vehicle interface, according to some aspects of the disclosed technology.

FIG. 4 illustrates remote assistance 132 as an exemplary remote requestor and remote vehicle interface 170, according to some aspects of the disclosed technology.

Figure 5:
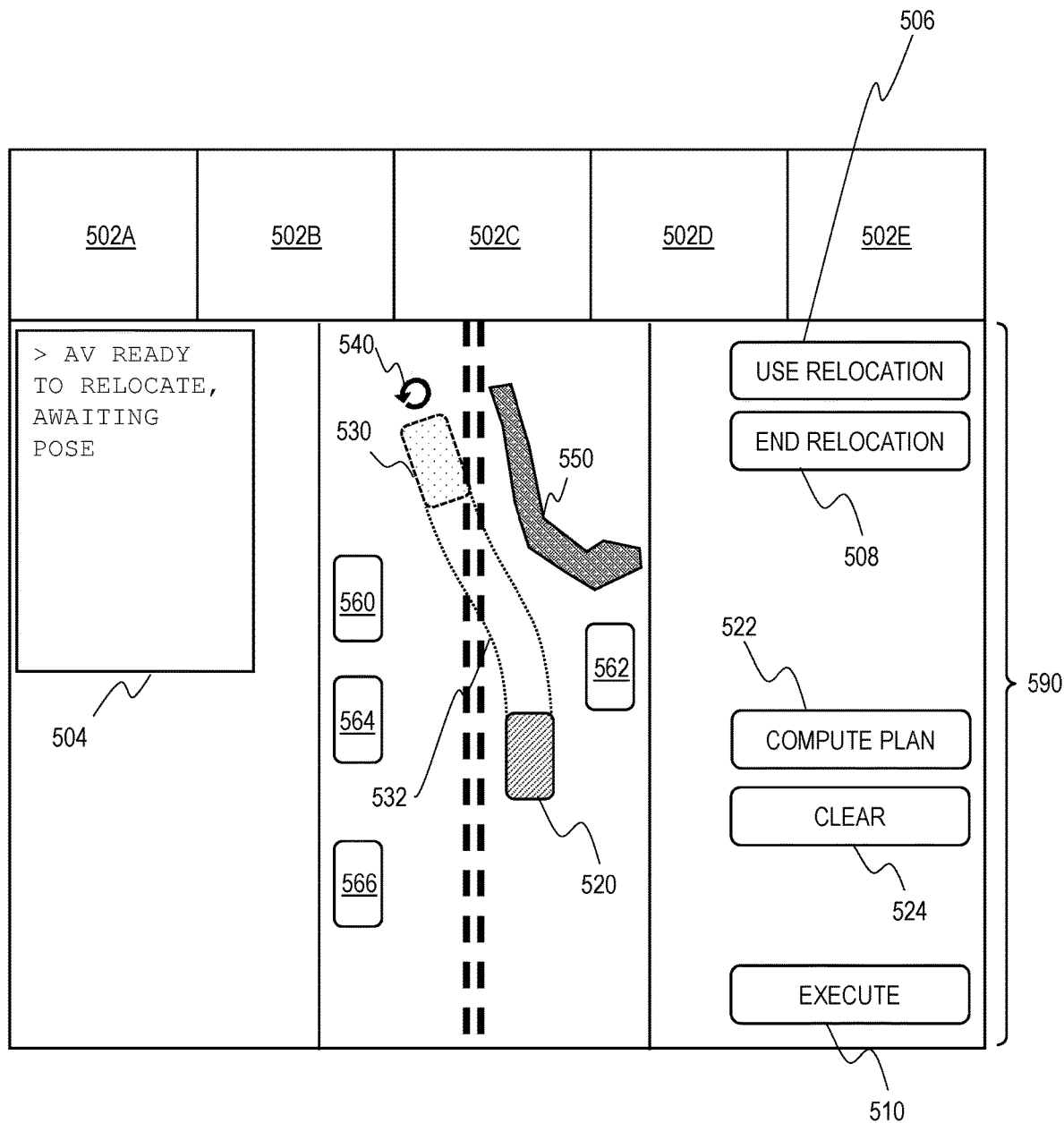
FIG. 5 illustrates an exemplary graphical user interface for remote assistance, according to some aspects of the disclosed technology.

Remote assistance 132 may include a graphical user interface 402 with which remote advisors may interact. An exemplary depiction of the graphical user interface 402 is shown in FIG. 5. An exemplary workflow involving the graphical user interface 402 and an AV to be relocated is illustrated with FIG. 6. Advisor may provide user input to remote assistance 132 via graphical user interface 402 using one or more user input devices. Graphical user interface 402 may display information that may assist the advisor. The information may include one or more of: sensor data streams (e.g., camera feeds), map information with detected obstacles, path information of output plan generated by a motion planner, vehicle state information, relocation state information, relocation feedback information, scenario evaluation feedback information, contextual information about the AV, information from the AV stack, tracking information from the AV, perception information from the AV, prediction information from the AV, planning information from the AV, information in arrow 232 from remote vehicle interface 170, etc. Graphical user interface 402 may implement continuous authorization functionality to check whether the advisor asserts continuous authorization of relocation (e.g., detecting that a button or key has been pressed continuously, or without releasing the button or key). Graphical user interface 402 may implement a charging functionality to detect whether a button or key has been pressed continuously for a sufficient amount of time to initiate a relocation session (e.g., to avoid a false relocation session initiations).

Remote assistance 132 may include relocation command generator 404, which may translate user interaction with graphical user interface 402 into relocation commands in accordance with the application programming interface of the remote vehicle interface 170. In some cases, relocation command generator 404 may determine the advisor's expert level, and generate a relocation command that instructs relocation to be performed using a certain expert mode that corresponds to the advisor's expert level.

Remote assistance 132 may include relocation command validation 406, which may perform checks to ensure that the relocation command is valid. In some cases, relocation command validation 406 may perform checks to determine whether the user input is valid. The checks may include checking whether the target relocation pose is valid. The checks may include checking whether a generated relocation command is a valid command given a current relocation state. The checks may include checking whether an advisor is authorized to make relocation commands. The checks may include checking whether an advisor is authorized to execute an output plan that requires an advisor with a certain expert level. The checks may include checking whether the advisor is authorized to perform relocation using a certain expert mode. The checks may include checking whether the target relocation pose is near or in an intersection.

Exemplary Graphical User Interface of Remote Assistance Part for Performing Relocation FIG. 5 illustrates an exemplary depiction of graphical user interface 402, according to some aspects of the disclosed technology. Graphical user interface 402 displays information to the advisor to request, authorize, and supervise relocation of an AV. Graphical user interface 402 includes user interface components that enables the advisor to command relocation of the AV.

Graphical user interface 402 may include one or more areas, such as areas 502A-502E, to display sensor data feeds, such as images (e.g., images of live video feeds) from different cameras of an AV.

Graphical user interface 402 may include a map view 590 that shows the AV as shape 520 overlaid on a map (based on a current pose of the AV on the map). The map view 590 may show other tracked objects 560, 562, 564, and 566. The map view 590 may show detected occupied space 550 (e.g., detected obstacles) in the vicinity of the AV. Map view 590 may display semantic map information (e.g., road boundaries, lane boundaries, direction of travel, streetlights, etc.).

Graphical user interface 402 may include an information display area 504 for displaying textual information that may assist the advisor. Textual information may be based on vehicle state information, or any other information associated with the AV. Textual information may include information derived from scenario evaluation feedback. Textual information may include vehicle events. Textual information may include relocation state information. Textual information may include faults or fault conditions occurring on the AV.

Graphical user interface 402 may include a "use relocation" button 506 as a user interface component. Pressing the "use relocation" button 506 may put the graphical user interface 402 in a relocation mode (e.g., the arrangement or display of the graphical user interface 402 may change to suit relocation, availability of certain user interface components may change to suit relocation, etc.). AV may engage relocation. AV may receive a start relocation request.

Graphical user interface 402 may include an "end relocation" button 508 as a user interface component. Pressing the "end relocation" button 508 may put the graphical user interface 402 in a normal remote assistance mode (e.g., the arrangement or display of the graphical user interface 402 may change to suit normal remote assistance, availability of certain user interface components may change to suit normal remote assistance, etc.). AV may disengage relocation. AV may receive a stop relocation solution request.

Graphical user interface 402 may include user interface components to allow an advisor to input a desired target relocation pose. For instance, the advisor may drag and drop the AV on map view 590 and allow the advisor to be able to visually place shape 530 on map view 590 to indicate the desired target relocation position on the map view 590. The advisor can rotate shape 530 on map view 590 using the rotation user interface component 540 to indicate a desired target relocation orientation/heading.

Graphical user interface 402 may include a "compute plan" button 522 as a user interface component. Pressing or selecting the "compute plan" button 522 may cause the AV (e.g., a freespace planner) to compute a feasible output plan to the indicated target relocation pose (depicted as shape 530). AV may receive a generate relocation solution request to compute an output plan. The path information of a computed output plan may be visualized or displayed in the graphical user interface as shape 532.

Graphical user interface 402 may include a "clear" button 524 as a user interface component. Pressing or selecting the "clear" button 524 may cause the AV clear target relocation pose. AV may receive a reset relocation solution request. Location of shape 530 may reset to the current pose of the AV (e.g., overlapping with shape 520). An advisor may input a new target relocation pose after clearing the target relocation pose.

Graphical user interface 402 may include an "execute" button 510 as a user interface component. Pressing the "execute" button 510 and holding/charging the "execute" button 510 may authorize an output plan generated by a freespace planner to be executed by the AV. AV may receive an execute relocation solution request to execute the authorized output plan. Continuous holding the "execute" button 510 may ensure that the AV continues to execute the authorized output plan. The AV may receive a stream of execute relocation solution requests. The stream of requests may have a certain cadence, e.g., 2 Hz or another suitable frequency. When the stream of requests is no longer being received by the AV at or above the cadence, the AV may determine that the output plan is no longer authorized, and the AV may gracefully come to a stop.

As the AV moves, e.g., when the AV is executing relocation, the map view 590 may be updated, where shape 520 representing the AV's current pose may be updated. Shape 532 representing an output plan being executed may be updated to remove portions of the output plan the AV has traveled.

Exemplary End-to-End Workflow Between Remote Assistance and the AV

Figure 6:
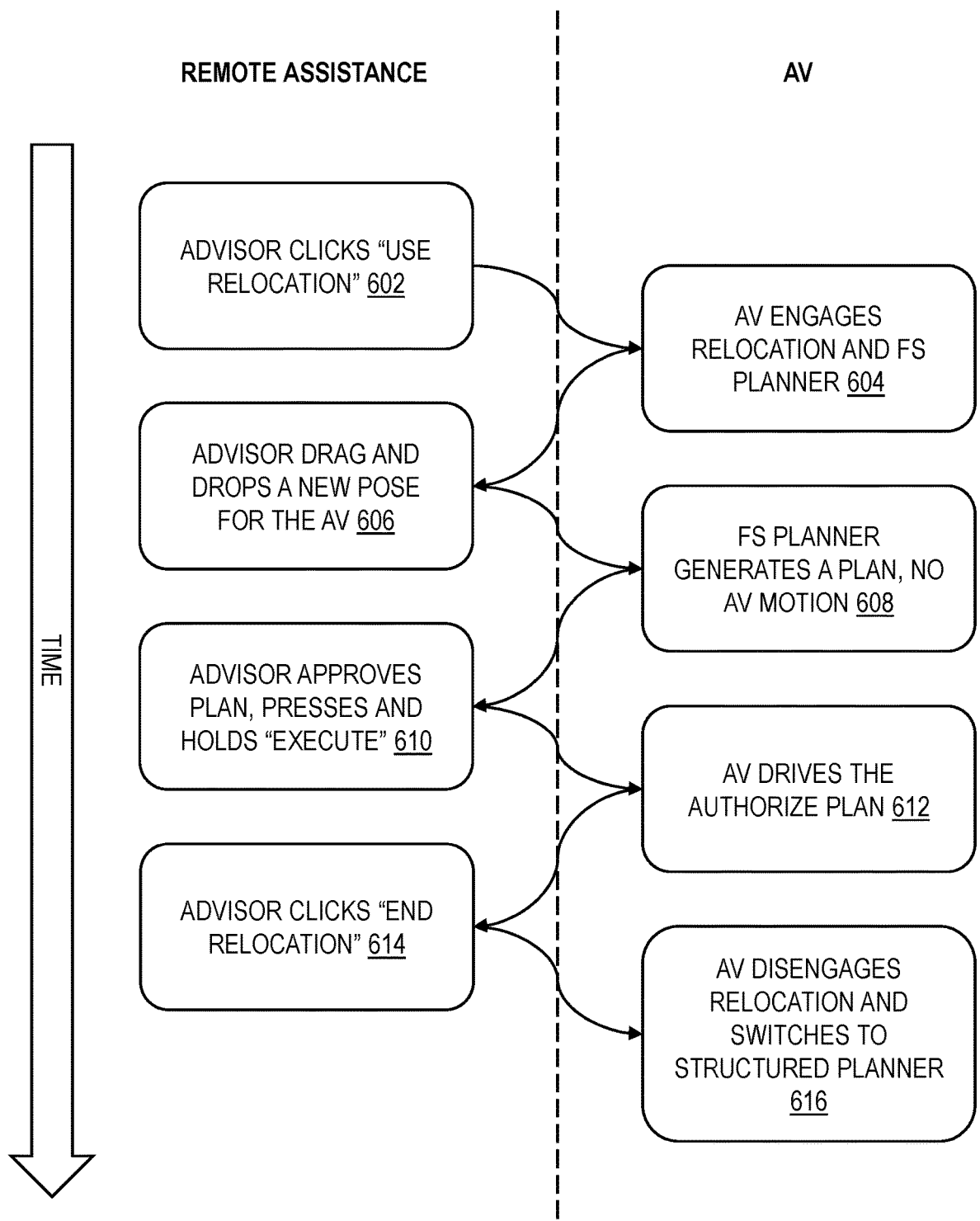
FIG. 6 illustrates an end-to-end workflow of a remote relocation session, according to some aspects of the disclosed technology.

FIG. 6 illustrates an end-to-end workflow of a remote relocation session, according to some aspects of the disclosed technology. The workflow may involve using the graphical user interface 402 illustrated in FIGS. 4-5. The workflow may involve triggering relocation workflow described with FIGS. 1-3. In 602, advisor may click a "use relocation" button on a graphical user interface. In 604, AV may engage relocation and the freespace planner. In 606, advisor may drag and drop a new pose for the AV on the graphical user interface. In 608, freespace planner may generate an output plan. AV does not move. In 610, advisor may approve the output plan by pressing and holding an "execute" button on the graphical user interface. In 612, AV may drive the authorized output plan. In 614, advisor may click an "end relocation" button on the graphical user interface. In 616, AV may disengage relocation and switch control back to a structured planner.

Exemplary Methods Implemented by the Remote Vehicle Interface

Figure 7:
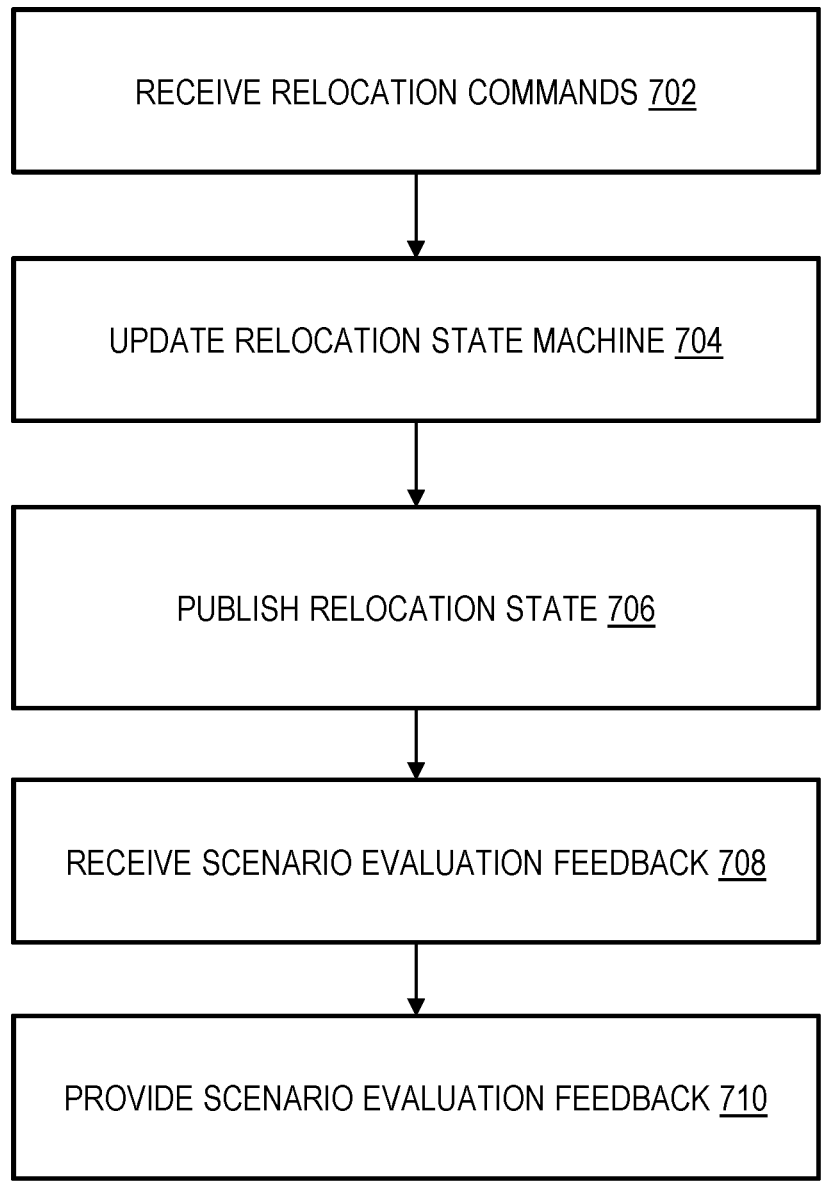
FIG. 7 is a flow diagram illustrating a computer-implemented method that can be performed by a remote vehicle interface, according to some aspects of the disclosed technology.

FIG. 7 is a flow diagram illustrating a computer-implemented method that can be performed by a remote vehicle interface (e.g., remote vehicle interface 170 in FIGS. 1-3), according to some aspects of the disclosed technology. The method may be carried out by and/or implemented in systems such as the AV management system 900 of FIG. 9 and processor-based system 1000 of FIG. 10. In 702, the remote vehicle interface implemented on the vehicle may receive relocation commands of a relocation session from a requestor of remote relocation of the vehicle. In 704, the remote vehicle interface may update a relocation state machine based on the received relocation commands and vehicle events of the vehicle. In 706, the remote vehicle interface may publish a relocation state (of the relocation state machine) to a scenario manager of a plurality of motion planners. The motion planners may include a freespace planner to execute relocation of the vehicle. In 708, the remote vehicle interface may receive scenario evaluation feedback from the freespace planner. In 710, the remote vehicle interface may provide the scenario evaluation feedback to the requestor.

Exemplary Methods Implemented by the Scenario Manager

Figure 8:
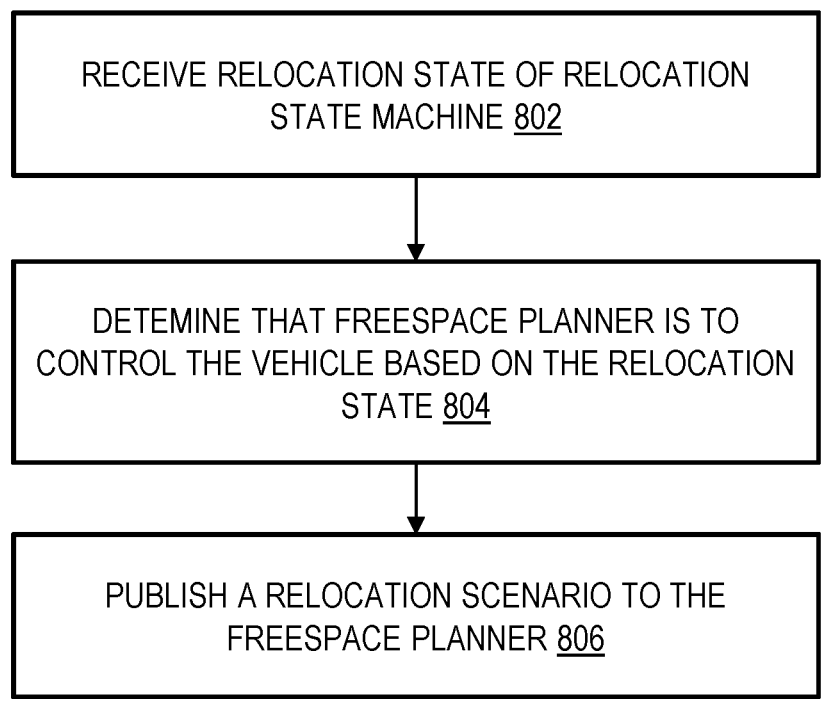
FIG. 8 is a flow diagram illustrating a computer-implemented method that can be performed by a scenario manager, according to some aspects of the disclosed technology.

FIG. 8 is a flow diagram illustrating a computer-implemented method that can be performed by a scenario manager (e.g., scenario manager 150 of FIGS. 1-2), according to some aspects of the disclosed technology. The method may be carried out by and/or implemented in systems such as the AV management system 900 of FIG. 9 and processor-based system 1000 of FIG. 10. In 802, the scenario manager may receive a relocation state of a relocation state machine in a remote vehicle interface. In 804, the scenario manager may determine that a freespace planner is to control the vehicle based on the relocation state. The freespace planner can be one of the plurality of motion planners of the vehicle. In 806, the scenario manager may publish a relocation scenario to the freespace planner. The freespace planner can execute the relocation scenario.

Exemplary AV Management System

Figure 9:
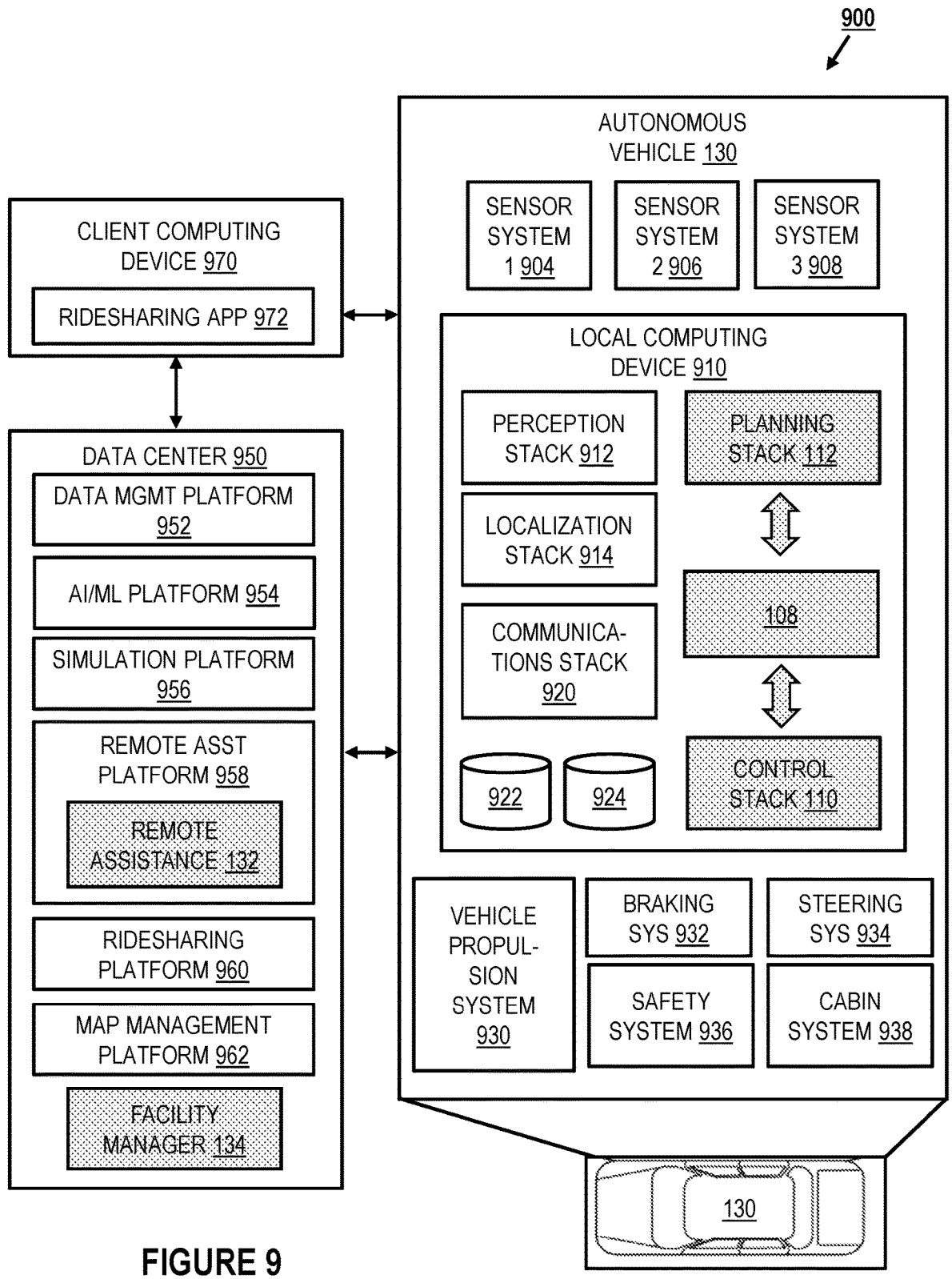
FIG. 9 illustrates an exemplary system environment that may be used to facilitate AV operations, according to some aspects of the disclosed technology.

Turning now to FIG. 9, this figure illustrates an example of an AV management system 900, in which some of the aspects of the present disclosure can be implemented. One of ordinary skill in the art will understand that, for the AV management system 900 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 900 includes an AV 130, a data center 950, and a client computing device 970. The AV 130, the data center 950, and the client computing device 970 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 130 may navigate about roadways without a human driver based on sensor signals generated by multiple sensor systems 904, 906, and 908. The sensor systems 904-908 may include different types of sensors and may be arranged about the AV 130. For instance, the sensor systems 904-908 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 904 may be a camera system, the sensor system 906 may be a LIDAR system, and the sensor system 908 may be a RADAR system. Other embodiments may include any other number and type of sensors.

AV 130 may also include vehicle hardware controls, including several mechanical systems 930-938 that may be used to maneuver or operate AV 130. For instance, the vehicle hardware controls may include vehicle propulsion system 930, braking system 932, steering system 934, safety system 936, and cabin system 938, among other systems. Vehicle hardware controls may include vehicle signal lights, vehicle honk, vehicle gear, vehicle doors, etc. Vehicle propulsion system 930 may include an electric motor, an internal combustion engine, or both. The braking system 932 may include an engine brake, a wheel braking system (e.g., a disc braking system that utilizes brake pads), hydraulics, actuators, and/or any other suitable componentry configured to assist in decelerating AV 130. The steering system 934 may include suitable componentry configured to control the direction of movement of the AV 130 during navigation. Safety system 936 may include lights and signal indicators, a parking brake, airbags, and so forth. The cabin system 938 may include cabin temperature control systems, in-cabin entertainment systems, and so forth. In some embodiments, the AV 130 may not include human driver actuators (e.g., steering wheel, handbrake, foot brake pedal, foot accelerator pedal, turn signal lever, window wipers, etc.) for controlling the AV 130. Instead, the cabin system 938 may include one or more client interfaces (e.g., GUIs, Voice User Interfaces (VUIs), etc.) for controlling certain aspects of the mechanical systems 930-938.

AV 130 may additionally include a local computing device 910 that is in communication with the sensor systems 904-908, the mechanical systems 930-938, the data center 950, and the client computing device 970, among other systems. The local computing device 910 may include one or more processors and memory, including instructions that may be executed by the one or more processors. The instructions may make up one or more software stacks or components responsible for controlling the AV 130; communicating with the data center 950, the client computing device 970, and other systems; receiving inputs from riders, passengers, and other entities within the AV's environment; logging metrics collected by the sensor systems 904-908; and so forth. In this example, the local computing device 910 includes a perception stack 912, a mapping and localization stack 914, a planning stack 112, an interface 108, a vehicle control stack 110, a communication stack 920, an HD geospatial database 922, and an AV operational database 924, among other stacks and systems.

Perception stack 912 may enable the AV 130 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 904-908, the mapping and localization stack 914, the HD geospatial database 922, other components of the AV, and other data sources (e.g., the data center 950, the remote client computing device 970, third-party data sources, etc.). Perception stack 912 may detect and classify objects and determine their current and predicted locations, speeds, directions, and the like. In addition, the perception stack 912 may determine the free space around the AV 130 (e.g., to maintain a safe distance from other objects, change lanes, park the AV, etc.). Perception stack 912 may also identify environmental uncertainties, such as where to look for moving objects, flag areas that may be obscured or blocked from view, and so forth.

Mapping and localization stack 914 may determine the AV's position and orientation (pose) using different methods from multiple systems (e.g., GPS, IMUs, cameras, LIDAR, RADAR, ultrasonic sensors, the HD geospatial database 922, etc.). For example, in some embodiments, the AV 130 may compare sensor data captured in real-time by the sensor systems 904-908 to data in the HD geospatial database 922 to determine its precise (e.g., accurate to the order of a few centimeters or less) position and orientation. The AV 130 may focus its search based on sensor data from one or more first sensor systems (e.g., GPS) by matching sensor data from one or more second sensor systems (e.g., LIDAR). If the mapping and localization information from one system is unavailable, the AV 130 may use mapping and localization information from a redundant system and/or from remote data sources.

Planning stack 112 may determine how to maneuver or operate the AV 130 safely and efficiently in its environment. For instance, the planning stack 112 may produce a plan for the AV 130, which can include a (reference) trajectory. For example, the planning stack 112 may receive the location, speed, and direction of the AV 130, geospatial data, data regarding objects sharing the road with the AV 130 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 130 from one point to another. The planning stack 112 may determine multiple sets of one or more mechanical operations that the AV 130 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 112 may select from multiple backup plans to carry out. For example, while preparing to change lanes to turn right at an intersection, another vehicle may aggressively cut into the destination lane, making the lane change unsafe. The planning stack 112 could have already determined an alternative plan for such an event, and upon its occurrence, help to direct the AV 130 to go around the block instead of blocking a current lane while waiting for an opening to change lanes.

The vehicle control stack 110 may manage the operation of the vehicle propulsion system 930, the braking system 932, the steering system 934, the safety system 936, and the cabin system 938. Vehicle control stack 110 may receive a plan from the planning stack 112. The vehicle control stack 110 may receive sensor signals from the sensor systems 904-908 as well as communicate with other stacks or components of the local computing device 910 or a remote system (e.g., the data center 950) to effectuate the operation of the AV 130. For example, the vehicle control stack 110 may implement the final path or actions from the multiple paths or actions provided by the planning stack 112. The implementation may involve turning the plan from the planning stack 112 into commands for vehicle hardware controls such as the actuators that control the AV's steering, throttle, brake, and drive unit.

The communication stack 920 may transmit and receive signals between the various stacks and other components of the AV 130 and between the AV 130, the data center 950, the client computing device 970, and other remote systems. The communication stack 920 may enable the local computing device 910 to exchange information remotely over a network. The communication stack 920 may also facilitate local exchange of information, such as through a wired connection or a local wireless connection.

The HD geospatial database 922 may store HD maps and related data of the streets upon which the AV 130 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

AV operational database 924 may store raw AV data generated by the sensor systems 904-908 and other components of the AV 130 and/or data received by the AV 130 from remote systems (e.g., the data center 950, the client computing device 970, etc.). In some embodiments, the raw AV data may include HD LIDAR point cloud data, image or video data, RADAR data, GPS data, and other sensor data that the data center 950 may use for creating or updating AV geospatial data as discussed further below with respect to FIG. 5 and elsewhere in the present disclosure.

Data center 950 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 950 may include one or more computing devices remote to the local computing device 910 for managing a fleet of AVs and AV-related services. For example, in addition to managing the AV 130, the data center 950 may also support a ridehailing/ridesharing service, a delivery service, a remote/roadside assistance service, street services (e.g., street mapping, street patrol, street cleaning, street metering, parking reservation, etc.), and the like.

Data center 950 may send and receive various signals to and from the AV 130 and the client computing device 970. These signals may include sensor data captured by the sensor systems 904-908, roadside assistance requests, software updates, ridehailing/ridesharing pick-up and drop-off instructions, and so forth. In this example, the data center 950 includes one or more of a data management platform 952, an Artificial Intelligence/Machine Learning (AI/ML) platform 954, a simulation platform 956, a remote assistance platform 958, a ridehailing/ridesharing platform 960, a map management platform 962, facility manager 134, among other systems.

Data management platform 952 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridehailing/ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 950 may access data stored by the data management platform 952 to provide their respective services.

The AI/ML platform 954 may provide the infrastructure for training and evaluating machine learning algorithms for operating the AV 130, the simulation platform 956, the remote assistance platform 958, the ridehailing/ridesharing platform 960, the map management platform 962, and other platforms and systems. Using the AI/ML platform 954, data scientists may prepare data sets from the data management platform 952; select, design, and train machine learning models; evaluate, refine, and deploy the models; maintain, monitor, and retrain the models; and so on.

The remote assistance platform 958 may generate and transmit instructions regarding the operation of the AV 130. For example, in response to an output of the AI/ML platform 954 or other system of the data center 950, the remote assistance platform 958 may prepare instructions for one or more stacks or other components of the AV 130. Remote assistance platform 958 may include remote assistance 132.

The ridehailing/ridesharing platform 960 may interact with a customer of a ridehailing/ridesharing service via a ridehailing/ridesharing application 972 executing on the client computing device 970. The client computing device 970 may be any type of computing system, including a server, desktop computer, laptop, tablet, smartphone, smart wearable device (e.g., smart watch; smart eyeglasses or other Head-Mounted Display (HMD); smart car pods or other smart in-ear, on-car, or over-ear device; etc.), gaming system, or other general-purpose computing device for accessing the ridehailing/ridesharing application 972. The client computing device 970 may be a customer's mobile computing device or a computing device integrated with the AV 130. The ridehailing/ridesharing platform 960 may receive requests to be picked up or dropped off from the ridehailing/ridesharing application 972 and dispatch the AV 130 for the trip.

Map management platform 962 may provide a set of tools for the manipulation and management of geographic and spatial (geospatial) and related attribute data. The data management platform 952 may receive LIDAR point cloud data, image data (e.g., still image, video, etc.), RADAR data, GPS data, and other sensor data (e.g., raw data) from one or more AVs 130, Unmanned Aerial Vehicles (UAVs), satellites, third-party mapping services, and other sources of geospatially referenced data. The raw data may be processed, and map management platform 962 may render base representations (e.g., tiles (2D), bounding volumes (3D), etc.) of the AV geospatial data to enable users to view, query, label, edit, and otherwise interact with the data. Map management platform 962 may manage workflows and tasks for operating on the AV geospatial data. Map management platform 962 may control access to the AV geospatial data, including granting or limiting access to the AV geospatial data based on user-based, role-based, group-based, task-based, and other attribute-based access control mechanisms. Map management platform 962 may provide version control for the AV geospatial data, such as tracking specific changes that (human or machine) map editors have made to the data and to revert changes when necessary. Map management platform 962 may administer release management of the AV geospatial data, including distributing suitable iterations of the data to different users, computing devices, AVs, and other consumers of HD maps. Map management platform 962 may provide analytics regarding the AV geospatial data and related data, such as to generate insights relating to the throughput and quality of mapping tasks.

In some embodiments, the map viewing services of map management platform 962 may be modularized and deployed as part of one or more of the platforms and systems of the data center 950. For example, the AI/ML platform 954 may incorporate the map viewing services for visualizing the effectiveness of various object detection or object classification models, the simulation platform 956 may incorporate the map viewing services for recreating and visualizing certain driving scenarios, the remote assistance platform 958 may incorporate the map viewing services for replaying traffic incidents to facilitate and coordinate aid, the ridehailing/ridesharing platform 960 may incorporate the map viewing services into the ridehailing/ridesharing application 972 to enable passengers to view the AV 130 in transit enroute to a pick-up or drop-off location, and so on.

Exemplary Processor-Based System

Figure 10:
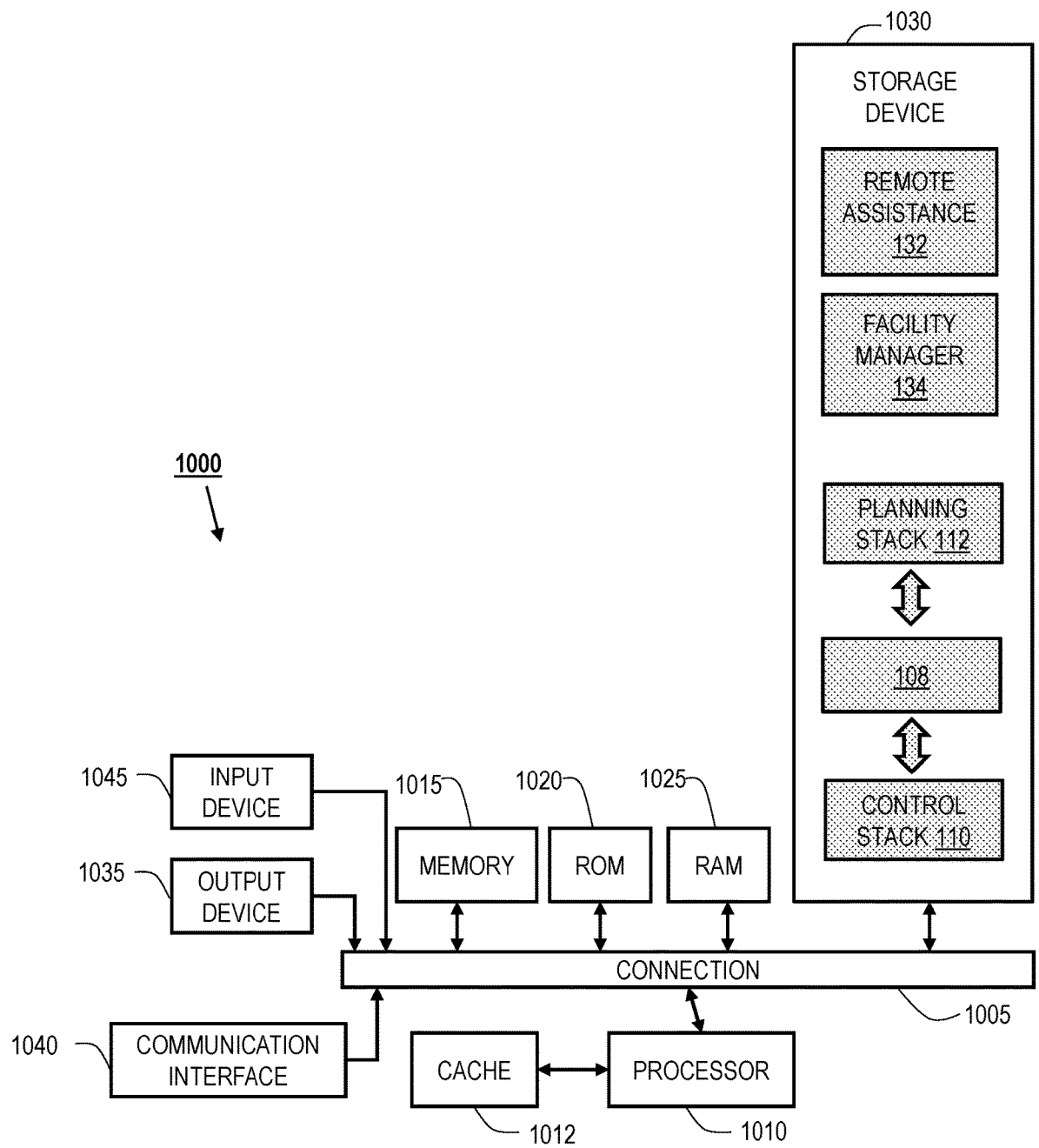
FIG. 10 illustrates an exemplary processor-based system with which some aspects of the subject technology may be implemented.

FIG. 10 illustrates an example processor-based system with which some aspects of the subject technology may be implemented. For example, processor-based system 1000 may be any computing device making up, or any component thereof in which the components of the system are in communication with each other using connection 1005. Connection 1005 may be a physical connection via a bus, or a direct connection into processor 1010, such as in a chipset architecture. Connection 1005 may also be a virtual connection, networked connection, or logical connection.

In some embodiments, computing system 1000 represents the local computing device 910 of FIG. 9. In some embodiments, computing system 1000 represents a computing system implemented in data center 950 of FIG. 9. In some embodiments, one or more of the described system components represents many such components each performing some or all of the function for which the component is described. In some embodiments, the components may be physical or virtual devices.

Example system 1000 includes at least one processing unit (Central Processing Unit (CPU) or processor) 1010 and connection 1005 that couples various system components including system memory 1015, such as Read-Only Memory (ROM) 1020 and Random-Access Memory (RAM) 1025 to processor 1010. Computing system 1000 may include a cache of high-speed memory 1012 connected directly with, in close proximity to, or integrated as part of processor 1010.

Processor 1010 may include any general-purpose processor and a hardware service or software service, such as executable instructions that implement functionalities carried out by one or more of remote assistance 132, facility manager 134, planning stack 112, interface 108, and vehicle control stack 110. In some embodiments, a hardware service that performs a particular function may include the software component stored in a computer-readable medium in connection with the necessary hardware components, such as processor 1010, connection 1005, output device 1035, etc., to carry out the function. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms known to those of skill in the art. In some instances, multimodal systems may enable a user to provide multiple types of input/output to communicate with computing system 1000. Computing system 1000 may include communications interface 1040, which may generally govern and manage the user input and system output. The communication interface may perform or facilitate receipt and/or transmission of wired or wireless communications via wired and/or wireless transceivers.

Storage device 1030 may be a non-volatile and/or non-transitory and/or computer-readable memory device and may be a hard disk or other types of computer-readable media which may store data that is accessible by a computer. Storage device 1030 may include software services, servers, services, etc., that when the code that defines such software is executed by the processor 1010, it causes the system 1000 to perform a function. Storage device 1030 may store instructions that encode a software stack or AV stack. Storage device 1030 may store instructions that encode one or more of remote assistance 132, facility manager 134, planning stack 112, interface 108, and vehicle control stack 110.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 is a vehicle comprising: vehicle hardware controls; one or more processors; and one or more storage media that store instructions executable by the one or more processors to implement a software stack, wherein the software stack includes: a planning stack comprising: a plurality of motion planners including a structured planner and a freespace planner, wherein the freespace planner has different constraints than the structured planner; a remote vehicle interface to receive relocation commands and to publish a relocation state to the scenario manager; and a scenario manager to generate a relocation scenario based on the relocation state, and to publish the relocation scenario to the freespace planner; and a vehicle control stack to receive an output plan from the freespace planner, and to output commands to the vehicle hardware controls to carry out the received output plan.

In Example 2, the vehicle of Example 1 can optionally include the freespace planner operating with fewer constraints than the structured planner.

In Example 3, the vehicle of Example 1 or 2 can optionally include: the structured planner produces planning to avoid collisions with obstacles and accounts for semantic map information; and the freespace planner producing the output plan to avoid collisions with obstacles and does not account for semantic map information.

In Example 4, the vehicle of any one of Examples 1-3 can optionally include the remote vehicle interface comprising a relocation state machine.

In Example 5, the vehicle of Example 4 can optionally include the relocation state machine comprises states, the states including: inactive, awaiting pose, paused, and moving.

In Example 6, the vehicle of Example 5 can optionally include the states further including engaging and disengaging.

In Example 7, the vehicle of any one of Examples 4-6 can optionally include the remote vehicle interface updating the relocation state machine based on the received relocation commands.

In Example 8, the vehicle of any one of Examples 4-7 can optionally include the remote vehicle interface updating the relocation state machine based on vehicle events.

In Example 9, the vehicle of any one of Examples 1-8 can optionally include the remote vehicle interface publishing vehicle state information.

In Example 10, the vehicle of any one of Examples 1-9 can optionally include the vehicle state information including path information in the output plan from the freespace planner.

In Example 11, the vehicle of any one of Example 1-10 can optionally include the scenario manager receiving a target relocation pose, and generating the relocation scenario based on the received target relocation pose.

In Example 12, the vehicle of any one of Examples 1-11 can optionally include the motion planners further including a stay still planner; and the scenario manager generating a stay still scenario based on the received relocation state and publishes the stay still scenario to the stay still planner.

In Example 13, the vehicle of any one of Examples 1-12 can optionally include the scenario manager receiving scenario evaluation feedback from the plurality of motion planners.

In Example 14, the vehicle of any one of Examples 1-13 can optionally include the scenario manager providing scenario evaluation feedback from the freespace planner to the remote vehicle interface.

In Example 15, the vehicle of Example 14 can optionally include the scenario evaluation feedback from the freespace planner including path information in the output plan from the freespace planner.

In Example 16, the vehicle of Example 14 or 15 can optionally include the scenario evaluation feedback from the freespace planner including an indication that no output plan can be determined for a given target relocation pose.

In Example 17, the vehicle of any one of Examples 14-16 can optionally include the scenario evaluation feedback from the freespace planner including an indication that a position of a given target relocation pose is achieved in the output plan but not an orientation of the given target relocation pose.

In Example 18, the vehicle of any one of Examples 14-17 can optionally include the scenario evaluation feedback from the freespace planner including an indication that an imminent collision is predicted.

In Example 19, the vehicle of any one of Examples 14-18 can optionally include the scenario evaluation feedback from the freespace planner including alternative output plans executable by the vehicle control stack.

Example 20 is a computer-implemented method to manage remote relocation of a vehicle, the method comprising:

receiving, by a remote vehicle interface implemented on the vehicle, relocation commands of a relocation session from a requestor of remote relocation of the vehicle; updating, by the remote vehicle interface, a relocation state machine based on the received relocation commands and vehicle events of the vehicle; publishing, by the remote vehicle interface, a relocation state to a scenario manager of a plurality of motion planners, the motion planners including a freespace planner to execute relocation of the vehicle; receiving, by the remote vehicle interface, scenario evaluation feedback from the freespace planner; and providing, by the remote vehicle interface, the scenario evaluation feedback to the requestor.

In Example 21, the computer-implemented method of Example 20 can optionally include the relocation commands including: a message requesting that the vehicle enter a relocation mode.

In Example 22, the computer-implemented method of Example 20 or 21 can optionally include the relocation commands including: a message requesting the freespace planner to compute an output plan based on a target relocation pose.

In Example 23, the computer-implemented method of any one of Examples 20-22 can optionally include the relocation commands including: a message requesting the freespace planner to execute an output plan computed by the freespace planner.

In Example 24, the computer-implemented method of any one of Examples 20-23 can optionally include the relocation commands including: a message requesting that the vehicle to clear a target relocation pose.

In Example 25, the computer-implemented method of any one of Examples 20-24 can optionally include the relocation commands including: a message requesting that the vehicle exits a relocation mode.

In Example 26, the computer-implemented method of any one of Examples 20-25 can optionally include updating the relocation state machine comprising: performing state transitions based on the relocation commands and the vehicle events.

In Example 27, the computer-implemented method of Example 26 can optionally include the relocation state machine having states, the states including: inactive, awaiting pose, paused, and moving.

In Example 28, the computer-implemented method of Example 27 can optionally include the states further including engaging and disengaging.

In Example 29, the computer-implemented method of any one of Examples 20-28 can optionally include updating the relocation state machine comprising: preventing a state transition of the relocation state machine to an ENGAGING state if one or more doors of the vehicle are open.

In Example 30, the computer-implemented method of any one of Examples 20-29 can optionally include updating the relocation state machine comprising: preventing a state transition of the relocation state machine to an ENGAGING state if the vehicle is in a degraded state.

In Example 31, the computer-implemented method of any one of Examples 20-30 can optionally include updating the relocation state machine comprising: preventing a state transition of the relocation state machine to an ENGAGING state if the vehicle is not stationary.

In Example 32, the computer-implemented method of any one of Examples 20-31 can optionally include updating the relocation state machine comprising: preventing a state transition of the relocation state machine to an ENGAGING state if the vehicle is a minimal risk condition.

In Example 33, the computer-implemented method of any one of Examples 20-32 can optionally include publishing the relocation state comprising: publishing a current state of the relocation state machine.

In Example 34, the computer-implemented method of any one of Examples 20-34 can optionally include publishing the relocation state comprising: publishing one or more state transition failure reasons of the relocation state machine.

In Example 35, the computer-implemented method of any one of Examples 20-34 can optionally include publishing the relocation state comprising: publishing a target relocation pose of the vehicle.

In Example 36, the computer-implemented method of any one of Examples 20-35 can optionally include publishing the relocation state comprising: publishing an identifier of the relocation session.

In Example 37, the computer-implemented method of any one of Examples 20-36 can optionally include publishing the relocation state comprising: publishing an indication that a state of the relocation state machine changed for a current tick.

In Example 38, the computer-implemented method of any one of Examples 20-37 can optionally include receiving the scenario evaluation feedback comprising: receiving path information in an output plan generated by the freespace planner.

In Example 39, the computer-implemented method of any one of Examples 20-38 can optionally include receiving the scenario evaluation feedback comprising: receiving an indication that no output plan can be determined by the freespace planner for a given target relocation pose.

In Example 40, the computer-implemented method of any one of Examples 20-39 can optionally include receiving the scenario evaluation feedback comprising: receiving an indication that a position of a given target relocation pose is achievable in the output plan generated by the freespace planner but not an orientation of the given target relocation pose.

In Example 41, the computer-implemented method of any one of Examples 20-40 can optionally include receiving the scenario evaluation feedback comprising: receiving an indication that an imminent collision is predicted.

In Example 42, the computer-implemented method of any one of Examples 20-41 can optionally include receiving the scenario evaluation feedback comprising: receiving alternative output plans generated by the freespace planner.

In Example 43, the computer-implemented method of any one of Examples 20-42 can optionally include the requestor being a remote assistance platform.

In Example 44, the computer-implemented method of any one of Examples 20-42 can optionally include the requestor being a facility manager managing a fleet of vehicles in a facility.

Example 45 is a computer-implemented method to manage remote relocation of a vehicle, the method comprising: receiving, by the scenario manager, a relocation state of a relocation state machine in a remote vehicle interface; determining, by the scenario manager, that a freespace planner is to control the vehicle based on the relocation state, wherein the freespace planner is one of the plurality of motion planners of the vehicle; and publishing, by the scenario manager, a relocation scenario to the freespace planner, wherein the freespace planner is to execute the relocation scenario.

In Example 46, the computer-implemented method of Example 45 can optionally include the relocation state including one or more of the following: inactive, awaiting pose, paused, and moving.

In Example 47, the computer-implemented method of Example 45 can optionally include the relocation state including one or more of the following: inactive, awaiting pose, paused, moving, engaging, and disengaging.

In Example 48, the computer-implemented method of any one of Examples 45-47 can optionally include: determining, by the scenario manager, that a stay still planner is to control the vehicle when the relocation state is an ENGAGING state, wherein the stay still planner is one of the plurality of motion planners of the vehicle; and publishing, by the scenario manager, a stay still scenario to the stay still planner, wherein the stay still planner is to execute the stay still scenario.

In Example 49, the computer-implemented method of any one of Examples 45-48 can optionally include: determining, by the scenario manager, that a stay still planner is to control the vehicle when the relocation state is a DISENGAGING state, wherein the stay still planner is one of the plurality of motion planners of the vehicle; and publishing, by the scenario manager, a stay still scenario to the stay still planner, wherein the stay still planner is to execute the stay still scenario.

In Example 50, the computer-implemented method of any one of Examples 45-49 can optionally include: in response to determining that the freespace planner is to control the vehicle, controlling an interface to selectively provide an output plan of the freespace planner among outputs of the plurality of motion planners to a vehicle control stack.

In Example 51, the computer-implemented method of any one of Examples 45-50 can optionally include: receiving, by the scenario manager, scenario evaluation feedback from the freespace planner; and providing, by the scenario manager, the scenario evaluation feedback to the remote vehicle interface.

In Example 52, the computer-implemented method of Example 51 can optionally include: providing the scenario evaluation feedback comprising: providing path information in an output plan generated by the freespace planner.

In Example 53, the computer-implemented method of Example 51 or 52 can optionally include providing the scenario evaluation feedback comprising: providing an indication that no output plan can be determined by the freespace planner for a given target relocation pose.

In Example 54, the computer-implemented method of any one of Examples 51-53 can optionally include providing the scenario evaluation feedback comprising: providing an indication that a position of a given target relocation pose is achievable in the output plan generated by the freespace planner but not an orientation of the given target relocation pose.

In Example 55, the computer-implemented method of any one of Examples 51-54 can optionally include providing the scenario evaluation feedback comprising: providing an indication that an imminent collision is predicted.

In Example 56, the computer-implemented method of any one of Examples 51-55 can optionally include providing the scenario evaluation feedback comprising: providing alternative output plans generated by the freespace planner.

In Example 57, the computer-implemented method of any one of Examples 45-56 can optionally include evaluating, by the scenario manager, priorities of the relocation scenario and other scenarios; and determining that the relocation scenario has the highest priority.

In Example 58, the computer-implemented method of any one of Examples 45-57 can optionally include reporting, by the scenario manager, a failure to give control to the freespace planner to the remote vehicle interface.

In Example 59, the computer-implemented method of any one of Examples 45-58 can optionally include reporting, by the scenario manager, a failure to give control to a structured planner to the remote vehicle interface.

In Example 60, the computer-implemented method of any one of Examples 45-59 can optionally include reporting, by the scenario manager, a failure to give control to a stay still planner to the remote vehicle interface.

Example 61 includes one or more non-transitory computer-readable media storing instructions that, when executed by one or more processors, cause the one or more processors to perform any one of the computer-implemented methods of Examples 20-60.

Example 62 is an apparatus comprising means to carry out any one of the computer-implemented methods of Examples 20-60.

What is claimed is:

1. A vehicle comprising:
   vehicle hardware controls;
   one or more processors; and
   one or more storage media that store instructions executable by the one or more processors to implement a software stack, wherein the software stack includes:
      a planning stack comprising:
         a plurality of motion planners including a structured planner and a freespace planner, wherein the freespace planner has different constraints than the structured planner;
         a remote vehicle interface to receive relocation commands and to publish a relocation state to a scenario manager; and
         the scenario manager to generate a relocation scenario based on the relocation state, and to publish the relocation scenario to the freespace planner; and
      a vehicle control stack to receive an output plan from the freespace planner, and to output commands to the vehicle hardware controls to carry out the output plan,
   wherein the scenario manager provides scenario evaluation feedback from the freespace planner to the remote vehicle interface, and
   wherein the scenario evaluation feedback from the freespace planner includes an indication that a position of a given target relocation pose is achieved in the output plan but not an orientation of the given target relocation pose.

2. The vehicle of claim 1, wherein the freespace planner operates with fewer constraints than the structured planner.

3. The vehicle of claim 1, wherein:
   the structured planner produces plans to avoid collisions with obstacles and accounts for semantic map information; and
   the freespace planner produces the output plan to avoid collisions with obstacles and does not account for semantic map information.

4. The vehicle of claim 1, wherein the remote vehicle interface comprises a relocation state machine.

5. The vehicle of claim 4, wherein the relocation state machine comprises states, the states including one or more of: inactive, awaiting pose, paused, and moving.

6. The vehicle of claim 5, wherein the states further include engaging and disengaging.

7. The vehicle of claim 4, wherein the remote vehicle interface updates the relocation state machine based on the relocation commands.

8. The vehicle of claim 4, wherein the remote vehicle interface updates the relocation state machine based on vehicle events.

9. The vehicle of claim 1, wherein the remote vehicle interface publishes vehicle state information.

10. The vehicle of claim 1, wherein the scenario manager receives a target relocation pose, and generates the relocation scenario based on the target relocation pose.

11. The vehicle of claim 1, wherein:
    the motion planners further include a stay still planner; and
    the scenario manager generates a stay still scenario based on the relocation state and publishes the stay still scenario to the stay still planner.

12. The vehicle of claim 1, wherein the scenario manager receives scenario evaluation feedback from the plurality of motion planners.

13. The vehicle of claim 1, wherein the scenario evaluation feedback from the freespace planner includes path information in the output plan from the freespace planner.

14. The vehicle of claim 1, wherein the scenario evaluation feedback from the freespace planner includes an indication that no output plan can be determined for a given target relocation pose.

15. The vehicle of claim 1, wherein the scenario evaluation feedback from the freespace planner includes an indication that an imminent collision is predicted.

16. The vehicle of claim 1, wherein the scenario evaluation feedback from the freespace planner includes alternative output plans executable by the vehicle control stack.

17. A computer-implemented method to manage remote relocation of a vehicle, the method comprising:
    receiving, by a remote vehicle interface implemented on the vehicle, relocation commands of a relocation session from a requestor of remote relocation of the vehicle;
    updating, by the remote vehicle interface, a relocation state machine based on the relocation commands and vehicle events of the vehicle;
    publishing, by the remote vehicle interface, a relocation state to a scenario manager of a plurality of motion planners, the motion planners including a freespace planner to execute relocation of the vehicle;
    receiving, by the remote vehicle interface, scenario evaluation feedback from the freespace planner, wherein the scenario evaluation feedback from the freespace planner includes alternative output plans executable by the vehicle control stack; and
    providing, by the remote vehicle interface, the scenario evaluation feedback to the requestor.

18. A computer-implemented method to manage remote relocation of a vehicle, the method comprising:
    receiving, by a scenario manager, a relocation state of a relocation state machine in a remote vehicle interface;
    determining, by the scenario manager, that a freespace planner is to control the vehicle based on the relocation state, wherein the freespace planner is one of a plurality of motion planners of the vehicle; and
    publishing, by the scenario manager, a relocation scenario to the freespace planner, wherein the freespace planner is to execute the relocation scenario,
    wherein the scenario manager provides scenario evaluation feedback from the freespace planner to the remote vehicle interface, and wherein the scenario evaluation feedback from the freespace planner includes an indication that a position of a given target relocation pose is achieved in the output plan but not an orientation of the given target relocation pose.

* * * * *